US010956723B2

(12) United States Patent
Marty et al.

(10) Patent No.: US 10,956,723 B2
(45) Date of Patent: Mar. 23, 2021

(54) SYSTEMS AND METHODS FOR DETERMINING REDUCED PLAYER PERFORMANCE IN SPORTING EVENTS

(71) Applicant: PILLAR VISION, INC., Menlo Park, CA (US)

(72) Inventors: Alan W. Marty, Menlo Park, CA (US); John Carter, Elkmont, AL (US); Cynthia T. Marty, Menlo Park, CA (US)

(73) Assignee: Pillar Vision, Inc., Menlo Park, CA (US)

( * ) Notice: Subject to any disclaimer, the term of this patent is extended or adjusted under 35 U.S.C. 154(b) by 0 days.

(21) Appl. No.: 16/026,029

(22) Filed: Jul. 2, 2018

(65) Prior Publication Data

US 2018/0322337 A1 Nov. 8, 2018

Related U.S. Application Data

(63) Continuation-in-part of application No. 15/839,445, filed on Dec. 12, 2017, now Pat. No. 10,010,778, which is a continuation-in-part of application No. 15/173,245, filed on Jun. 3, 2016, now Pat. No. 9,886,624.

(51) Int. Cl.
| | |
|---|---|
| *G06K 9/00* | (2006.01) |
| *A63B 69/00* | (2006.01) |
| *G06T 7/70* | (2017.01) |
| *G06T 7/20* | (2017.01) |
| *G06K 9/32* | (2006.01) |

(52) U.S. Cl.
CPC ..... *G06K 9/00342* (2013.01); *G06K 9/00724* (2013.01); *G06T 7/20* (2013.01); *G06T 7/70* (2017.01); *G06K 9/3241* (2013.01); *G06T 2207/30224* (2013.01); *G06T 2207/30241* (2013.01)

(58) Field of Classification Search
USPC ....... 382/100, 103, 106–107, 162, 168, 173, 382/181, 189, 192, 209, 219, 232, 254, 382/274, 276, 286–295, 305, 312, 321; 348/46; 700/91; 463/37; 473/447
See application file for complete search history.

(56) References Cited

U.S. PATENT DOCUMENTS

| | | | |
|---|---|---|---|
| 6,148,271 | A | 11/2000 | Marinelli |
| 7,850,552 | B2 | 12/2010 | Marty et al. |
| 7,854,669 | B2 | 12/2010 | Marty et al. |
| 8,409,024 | B2 | 4/2013 | Marty et al. |

(Continued)

*Primary Examiner* — Seyed H Azarian
(74) *Attorney, Agent, or Firm* — Maynard Cooper & Gale, P.C.; Jon E. Holland

(57) ABSTRACT

Systems and methods are provided for determining reduced player performance during a sporting event. The system can use one or more sensors to capture information about actions such as shooting, dribbling, kicking and/or passing an object performed by the player and at least one processor to analyze the information in order to evaluate the player's performance. The system can determine and store at least one parameter indicative of the performance of the player in performing an action, and calculate based on the at least one stored parameter at least one value indicative of whether player intentionally underperformed the action and provide an output indicative of the assessment.

18 Claims, 7 Drawing Sheets

(56) References Cited

U.S. PATENT DOCUMENTS

| | | |
|---|---|---|
| 8,579,632 B2 | 11/2013 | Crowley |
| 8,597,095 B2 | 12/2013 | Crowley et al. |
| 8,622,832 B2 | 1/2014 | Marty et al. |
| 8,908,922 B2 | 12/2014 | Marty et al. |
| 8,948,457 B2 | 2/2015 | Marty et al. |
| 8,951,106 B2 | 2/2015 | Marty et al. |
| 9,257,054 B2 * | 2/2016 | Coza ............... A63B 43/004 |
| 9,275,470 B1 * | 3/2016 | Forkosh ............ G06T 7/248 |
| 9,298,418 B2 | 3/2016 | Crowley |
| 9,734,405 B2 | 8/2017 | Marty et al. |
| 9,886,624 B1 | 2/2018 | Marty et al. |
| 10,010,778 B2 | 7/2018 | Marty et al. |
| 2008/0200287 A1 | 8/2008 | Marty et al. |
| 2008/0312010 A1 * | 12/2008 | Marty ............... A63B 69/00 473/447 |
| 2014/0081436 A1 * | 3/2014 | Crowley ........... A61B 5/6895 700/91 |
| 2014/0364233 A1 * | 12/2014 | Fujishiro .......... A63F 13/42 463/37 |
| 2015/0112464 A1 * | 4/2015 | Crowley ......... G06Q 10/06393 700/91 |
| 2015/0332450 A1 * | 11/2015 | Marty ............... G06T 7/285 348/46 |

* cited by examiner

SYSTEMS AND METHODS FOR DETERMINING REDUCED PLAYER PERFORMANCE IN SPORTING EVENTS

CROSS-REFERENCE TO RELATED APPLICATIONS

This application is a Continuation-in-Part of U.S. patent application Ser. No. 15/839,445, filed Dec. 12, 2017, and entitled "Systems and Methods for Tracking Dribbling and Passing in Sporting Environments," which is a Continuation-in-Part of U.S. patent application Ser. No. 15/173,245, filed Jun. 3, 2016, and entitled "Systems and Methods for Tracking Dribbling in Sporting Environments," both of which applications are hereby incorporated by reference in their entirety.

BACKGROUND

Athletes often spend countless hours training in order to improve their skill level so that they can become more competitive in sporting events, such as basketball games, soccer games, hockey games, and games of other sports. In an effort to assist athletes in improving their skill level, systems have been developed that track an athlete's performance while training or participating in a sporting event and then provide feedback indicative of the performance. Such feedback can then be evaluated for helping the athlete to improve his/her skill level. As an example, commonly-assigned U.S. Pat. No. 7,094,164 describes a system that tracks the trajectory of a basketball during a basketball shot so that the shooter can use feedback from the system for the purpose of improving his/her skill at shooting basketballs.

Tracking the dribbling and/or passing performance of a player, such as a basketball, soccer, or hockey player, presents various challenges that may limit the effectiveness of a tracking system that attempts to assess dribbling or passing performance. As an example, a dribble or pass is often very short in duration and can occur at relatively high speeds. In addition, dribbling can involve the ball or puck changing direction and speed frequently. Further, the ball or puck being dribbled or passed often becomes at least temporarily hidden from view by players as they dribble or pass or guard against the player dribbling or passing making it difficult to consistently and accurately track the dribbles or passes over time. Further, unlike some other activities, such as shooting a basketball where an ideal trajectory can be characterized through certain parameters (e.g., entry angle) that do not significantly vary from shot-to-shot, the characteristics of an ideal dribble or pass can vary drastically depending on the dribbler's or passer's situation making it difficult to accurately assess the dribbler's or passer's performance and skill level.

Due to these and other challenges, very few attempts have been made to develop systems that attempt to determine when a player is acting at a reduced performance level during a sporting event.

BRIEF DESCRIPTION OF THE DRAWINGS

The included drawings are for illustrative purposes and serve only to provide examples of possible structures and process steps for the disclosed inventive systems and methods for providing game services to remote clients. These drawings in no way limit any changes in form and detail that may be made to the invention by one skilled in the art without departing from the spirit and scope of the invention.

DETAILED DESCRIPTION

Figure 1:
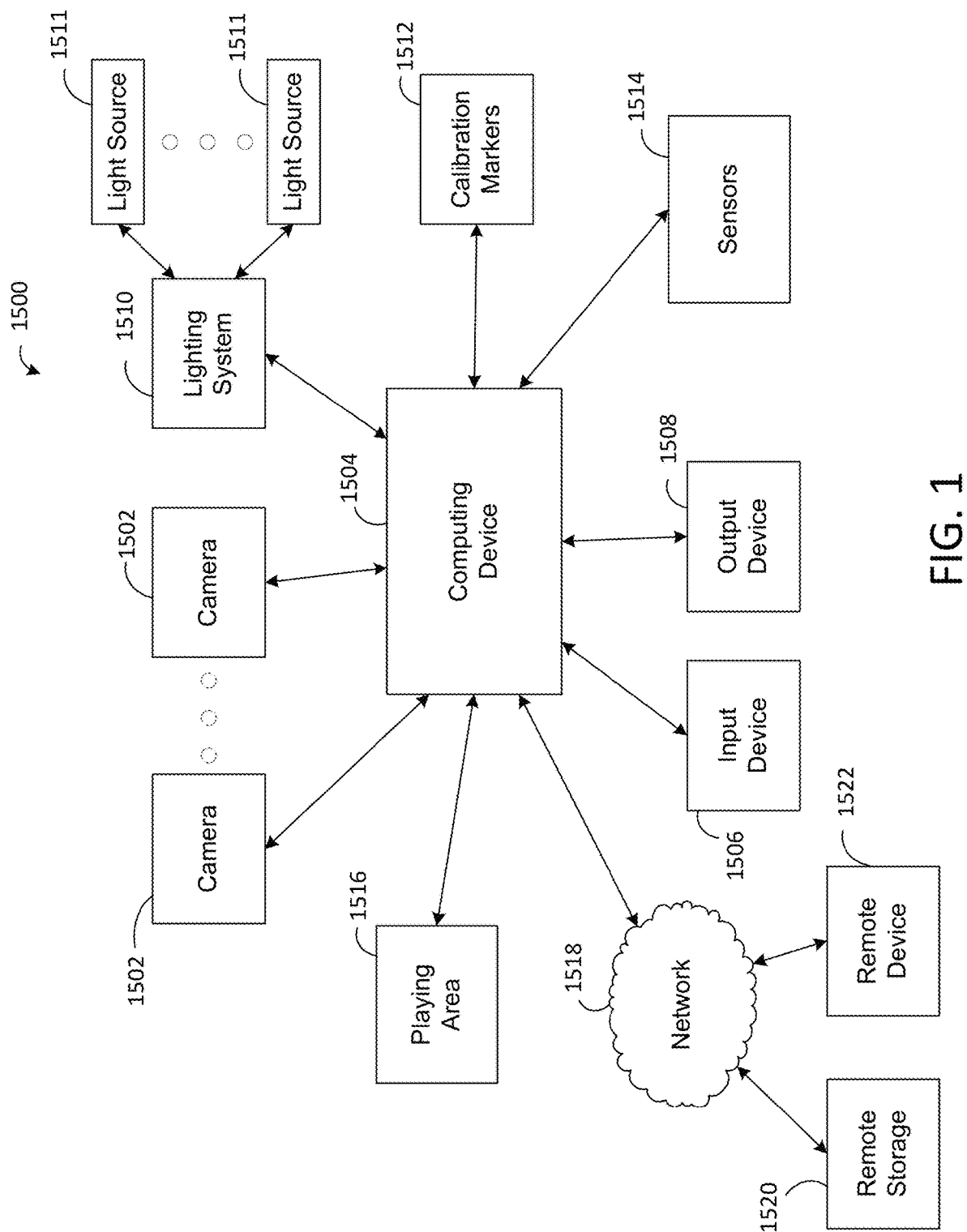
FIG. 1 is a block diagram of an embodiment of a performance tracking system.

Systems and methods are provided for tracking and evaluating a shooting, dribbling and/or passing motion (including the transition from a dribbling motion to a passing motion which can be referred to as a dribble-to-pass transition or the transition from a dribbling motion to a shooting motion which can be referred to as a dribble-to-shoot transition) associated with a person engaged in either a training session for a sporting event or the live play of the sporting event. In sporting events, a dribbling motion can be associated with a repetitive movement or a short trajectory sequence between changes of direction of a ball, puck or other object used in the sporting event. The repetitive movement or short trajectory sequence used for dribbling can involve an up-and-down movement such as in basketball or a back-and-forth movement of the ball or puck such as in soccer or hockey. A shooting motion can be associated with the movement of the object from a person toward a goal in order to place the object in the goal. A dribble-to-pass transition can be associated with the movement of the object during the ending of a dribbling motion by the person and the starting of a passing motion by the person. A dribble-to-shoot transition can be associated with the movement of the object during the ending of a dribbling motion by the person and the starting of a shooting motion by the person. A passing motion can be associated with the movement of the object between two people during the sporting event in order to transfer possession of the object from one person to another. The movement of the object during a passing motion can be forward, backward or to the side depending on the locations of the person passing the object (the passer) and the person receiving the object (the receiver). In one embodiment, systems and methods may also be provided for tracking and evaluating a kicking motion of a person engaged in either a training session for a sporting event or the live play of the sporting event such as soccer or football. For example, a kicking motion associated with attempting a field goal or an extra point in football (e.g., kicking the ball between the goal posts) or a shot in soccer (e.g., kicking the ball toward the goal) may be tracked and evaluated. The system can use one or more cameras to capture images of a person shooting, dribbling, kicking and/or passing an object, one or more sensors to capture data related to the shooting, dribbling, kicking and/or passing of the object, and at least one processor to analyze the images and/or sensor data to determine and evaluate one or more characteristics associated with the shooting, dribbling, kicking and/or passing motion. The characteristics can be related to: shot, dribble, kick and/or pass type; shot, dribble, kick and/or pass posture; shot, dribble, kick and/or pass attributes; and transition attributes.

In addition, in order to maintain the integrity of sporting events, it may be desirable to know when a player is not performing at the level usually associated with that player. The player may not perform at his/her usual performance level in a sporting event because the player is injured or under the influence of a substance or because the player is attempting to alter the outcome of the sporting event (or a portion of the sporting event) for illegitimate reasons (e.g., for gambling purposes, such as intentionally altering play in order to control whether a betting line is covered). To an observer of the sporting event, the result of an intentional action by the player may be indistinguishable from the same result that occurs from a natural action of the player. For example, an intentionally missed shot may look identical to a missed shot that the player was actually attempting to make.

In some embodiments, systems and methods are provided for determining whether a player's performance when performing an action during a sporting event is lower than an expected performance level for the player when performing the same action. A player's actions during a sporting event (e.g., shooting, dribbling and/or passing) can be evaluated and categorized based on a variety of different factors. Some of the factors can include the action type, the corresponding situation in the sporting event, the level of defense provided by a defender, the fatigue level of the player and/or other suitable factors associated with the action of the player (e.g., the player is trying to draw a foul on the defender). For example, the action type can be a shot type for a shooting action, the corresponding situation in the sporting event can be near the end of the sporting event with a close score, the level of defense can be a high level of defense on the player and the fatigue level can be a high level of fatigue for the player.

Once the action of the player has been categorized, corresponding characteristics associated with the categorized action can be determined based on the action of the player. For example, for a shooting action, some of the characteristics that may be used are the entry angle of the shot, the shot placement (e.g., the depth of the shot and the left-right position of the shot relative to the hoop of the basketball goal), the rotation speed of the ball, the rotation axis of the ball, the release height of the shot or the release speed of the shot. The determined characteristics for the player's action can then be evaluated with respect to expected characteristics for the player for the same (or substantially similar) categorized action. In one embodiment, the determined characteristics can be evaluated with respect to acceptable ranges of values for the corresponding characteristics. A probability that the player's action was atypical for the player (i.e., the player did not perform in a manner expected of the player) can be generated based on the evaluation of the determined characteristics for the player's action.

The generated probability of an atypical action for the player can then be compared to a threshold probability to determine whether there is an indication that the player is performing at a reduced performance level from what the player's normal performance level is for that categorized action. The determined indication can then be further evaluated and/or investigated to determine if there is a reason to suspect that the player is actually performing at a reduced performance level from what would be expected from the person. Some reasons the person may perform at a reduced performance level can include that the person is injured or under the influence of a substance or that the person is intentionally attempting to alter the natural outcome of the sporting event (or a portion of the sporting event) for illegitimate reasons, such as manipulation of betting outcomes.

In other embodiments, a player's actions during a sporting event (e.g., shooting, dribbling, kicking and/or passing) can be evaluated using machine learning. The deep learning process can receive a plurality of inputs such as video data and/or determined parameters associated with the action (e.g., the value of the entry angle for a shot) and generate an output that is indicative of whether the action is an atypical action for the player. The deep learning process may identify parameters based on the inputs to the deep learning process and generate the output based on the evaluation of the identified parameters.

FIG. 1 shows an embodiment of a system 1500 for tracking shooting, dribbling and/or passing motions (including the transition from a dribbling motion to a passing motion). For illustrative purposes, the system 1500 will be described in the context of shooting, dribbling and/or passing a basketball. However, the system can be used with shooting, dribbling and/or passing in other sports (e.g., soccer, hockey, or field hockey). The system may be particularly useful for tracking objects in sports, such as foosball, air hockey, table tennis, etc., that involve repetitive movements or short trajectory sequences between changes of direction of an object used by the sport.

The system 1500 can include at least two depth sensing cameras 1502 or other types of cameras communicatively coupled to a computing device 1504. The cameras 1502 can be positioned around and/or above an athletic playing surface (such as a basketball court or other type of playing area 1516) and used to capture images of a person shooting, dribbling and/or passing a basketball (including the dribble-to-pass transition). Various locations of the cameras 1502 are possible. As an example, cameras 1502 may be positioned on opposite sides of the playing area 1516 so that the basketball is visible to at least one of the cameras 1502 regardless of the direction that the person is facing or which side of the person's body that the basketball is located. At least one camera 1502 may be mounted on a ceiling or the structure associated with a basketball goal (e.g., the backboard of a basketball goal, a time clock located above the backboard or a pole that is coupled to the basketball goal).

The cameras 1502 can provide the captured images to the computing device 1504 as camera data. The computing device 1504 can analyze the camera data from the cameras 1502 to track the dribbling motion of the ball and determine and/or evaluate one or more characteristics of the dribbling motion, such as: the type of dribble (e.g., a cross-over dribble, a behind-the-back dribble, a between-the-legs dribble, etc.); the posture of the person performing the dribble (e.g., dribble stance, body motion and hand performing the dribbling); and the attributes of the dribbling (e.g., ball speed, dribble height, repetition rate, power, direction and turnovers).

In one embodiment, the type of dribble can refer to typical dribbling movements associated with the game of basketball. A cross-over dribble can refer to the movement of the ball from one hand of the player to the other hand of the player with a single dribble (or bounce) of the ball in front of the person. A behind-the-back dribble can refer to the movement of the ball from one hand of the player to the other hand of the player with a single dribble (or bounce) of the ball behind the person A between-the-legs dribble can refer to the movement of the ball from one hand of the player to the other hand of the player with a single dribble (or bounce) of the ball underneath the torso of the person such that the ball travels "between the legs" of the person. As will be described in more detail below, the computing device 1504 can determine the type of dribble by analyzing the motion of the ball relative to identified body parts (e.g., torso, legs, hands, etc.) of the person dribbling the ball.

In another embodiment, the dribbling attributes can refer to typical attributes associated with a dribbling motion. Ball speed can refer to the velocity of the ball as it travels to and from a person's hand. Dribble height can refer to the distance between the person's hand and the athletic playing surface. Repetition rate can refer to the number of times the ball leaves and returns to the person's hand in a defined time period. Power can refer to the amount of force applied to the ball by the person's hand. Turnovers can generally refer to a loss of control of the ball by the person dribbling the ball. As an example, a turnover can be detected when the ball transfers directly from the person dribbling to a player on another team or to an out-of-bounds area.

The computing device 1504 can also analyze the camera data from the cameras 1502 and/or sensor data from sensors to track a transition from a dribbling motion with the ball to a passing motion with the ball and/or track a passing motion with the ball. The computing device 1504 can determine and/or evaluate one or more characteristics of the dribble to pass transition and/or one or more characteristics of the passing motion, such as: the type of pass (e.g., a chest pass, a bounce pass, overhead pass, a behind-the-back pass, a baseball pass, etc.); the posture of the person performing the pass (e.g., passing stance, body motion and hand(s) performing the passing); the type of transition (e.g., a transition from a between-the legs dribble to a bounce pass, a transition from a crossover dribble to a chest pass, etc.), the attributes of the transition (e.g., time to gain control of ball after dribble, time to release pass after dribble, separation of person from a defender, and location of ball before pass); and the attributes of the passing (e.g., ball speed, pass height, pass location, pass accuracy, pass distance, release time, power, direction and turnovers).

Note that a transition from a dribble to a pass can include dribbling motions (e.g., dribbling motions just prior to making the pass) and passing motions (e.g., passing motions just after the last dribble by the player). Indeed, good players often initiate a passing motion while still performing a dribble or shortly thereafter such that the player's dribbling has a bearing on the type or quality of pass that the player makes, and the quality of a dribble-to-pass transition can be measured based on both dribbling parameters and passing parameters as the player transitions from dribbling to passing. Thus, in assessing the performance of a player in transitioning from a dribble to a pass, the system can determine a dribbling parameter indicative of dribbling performance just prior to making a pass and also determine a passing parameter indicative of passing performance as the player initiates a pass from a dribble. The system may then assess the dribble-to-pass transition (e.g., provide at least one value indicative of the player's performance in transitioning from the dribble to pass) based on both the dribbling parameter and the passing parameter. Various techniques for assessing player performance in dribbling, passing, transitioning from dribbling to passing, and performing other maneuvers will be described in more detail below.

In one embodiment, the type of pass can refer to typical passing movements associated with the game of basketball. A chest pass can refer to the movement of the ball from the front torso of one player to another player without contacting the playing surface. A behind-the-back pass can refer to the movement of the ball from behind one player to another player (the ball may or may not touch the playing surface). A bounce pass can refer to the movement of the ball from the front torso of one player to another player after touching the playing surface (i.e., bouncing off the playing surface), usually only one time. An overhead pass can refer to the movement of the ball from above the head of one player to another player without contacting the playing surface. A baseball pass can refer to the movement of the ball from the front of one player to another player without touching the playing surface using a single hand at or above shoulder level. As will be described in more detail below, the computing device 1504 can determine the type of pass by analyzing the motion of the ball relative to identified body parts (e.g., torso, legs, hands, etc.) of the person passing the ball, the playing surface and the person receiving the ball.

In another embodiment, the passing attributes can refer to typical attributes associated with a passing motion. Ball speed can refer to the velocity of the ball as it travels from a person's hand. Pass height can refer to the distance between the ball and the athletic playing surface when the ball exits the hand of the passer, the distance between the ball and the athletic playing surface when the ball arrives at the receiver or the average distance between the ball and the athletic playing surface as the ball travels between the passer and the receiver. Pass location can refer to the location of the ball (relative to the receiver) when the pass is completed (e.g., the pass is caught by the receiver or the pass travels out-of-bounds). Pass accuracy can refer to the ability of the passer to provide a pass to the receiver at a predefined pass location. Pass distance can refer to how far the pass travelled between passer and receiver. Release time can refer to the time to complete a passing motion and have the ball exit the passer's hands. Power can refer to the amount of force applied to the ball by the person's hand. Direction can refer to the direction (e.g., forward, backward, lateral, etc.) of the ball (relative to the passer) when travelling to the receiver. Turnovers can generally refer to a loss of control of the ball by either the person passing the ball or the person receiving the ball. As an example, a turnover can be detected when the ball transfers directly from the person passing the ball to a player on another team or to an out-of-bounds area.

In a further embodiment, the transition attributes can refer to typical attributes associated with a transition from a dribbling motion to a passing motion. A transition from a dribbling motion with the ball to a passing motion with the ball can refer to the sequence of steps performed to stop the dribbling motion, gain control of the ball, and pass the ball. The time to gain control of ball after dribble attribute can refer to the time period between when the person stops the dribbling motion and has gain control of the ball in order to begin a passing motion. The time to release a pass after a dribble attribute can refer to the time period between when the dribbling motion has stopped and the ball has exited the passer's hand(s). The separation of the person from a defender can refer to the distance between the passer and a defender (if present) when initiating the passing motion. The location of ball before pass attribute can refer to the location of the ball (relative to the passer) before starting the passing motion. In one embodiment, the transition from a dribbling motion to a passing motion can incorporate one or more characteristics of the dribbling motion and/or one or more characteristics of the passing motion, in addition to the characteristics of motions between the dribbling motion and the passing motion (to the extent that such in-between motions exist).

In addition, the computing device 1504 can also analyze the camera data from the cameras 1502 and/or sensor data from sensors 1514 to track a transition from a dribbling motion with the ball to a shooting motion with the ball and/or track a shooting motion with the ball. The computing device 1504 can determine and/or evaluate one or more parameters indicative of characteristics of the dribble to shoot transition and/or one or more parameters indicative of characteristics of the shooting motion, such as: the type of shot (e.g., a jump shot, a set shot, a lay-up, a three-point shot, a pull-up shot, a catch and shoot shot, a step-back shot, a driving shot, a hook shot, a free throw, etc.); the posture of the person performing the shot (e.g., shooting stance, body motion and hand(s) performing the shooting); the type of transition (e.g., a transition from a between-the legs dribble to a jump shot, a transition from a crossover dribble to a three-point shot, etc.), the attributes of the transition (e.g., time to gain control of ball after dribble, time to release shot after dribble, separation of person from a defender, and location of ball before shot); and the attributes of the shooting (e.g., the entry angle of the shot, entry velocity of the shot, shot trajectory, make/miss (i.e., whether the ball passes through the hoop during the shot), shot placement (e.g., depth of shot and left-right position of shot with respect to hoop), shot location (e.g., location on playing surface when shot is taken), shot height, release velocity of the shot, release height of the shot, and/or position of body or parts of the body of the shooter when taking a shot (e.g., position of the shooter's feet when shooting at the hoop). Various exemplary techniques for evaluating parameters indicative of or otherwise associated with characteristics of the shooting motion can be found in U.S. patent application Ser. No. 15/684,413, entitled "Systems and Methods for Tracking Basketball Player Performance" and filed on Aug. 23, 2017, U.S. Pat. No. 9,390,501, entitled "Stereoscopic Image Capture with Performance Outcome Prediction in Sporting Environments" and issued on Jul. 12, 2016, and U.S. patent application Ser. No. 15/346,509, entitled "Systems and Methods for Monitoring Basketballs Along Rebound Flight Paths" and filed on Nov. 8, 2016, each of which application or patent is incorporated herein by reference.

Note that a transition from a dribble to a shot can include dribbling motions (e.g., dribbling motions just prior to making the pass) and shooting motions (e.g., shooting motions just after the last dribble by the player). Indeed, good players often initiate a shooting motion while still performing a dribble or shortly thereafter such that the player's dribbling has a bearing on the type or quality of shot that the player makes, and the quality of a dribble-to-shot transition can be measured based on both dribbling parameters and shooting parameters as the player transitions from dribbling to shooting. Thus, in assessing the performance of a player in transitioning from a dribble to a shot, the system can determine a dribbling parameter indicative of dribbling performance just prior to making a pass and also determine a shooting parameter indicative of shooting performance as the player initiates a shot from a dribble. The system may then assess the dribble-to-shot transition (e.g., provide at least one value indicative of the player's performance in transitioning from the dribble to shot) based on both the dribbling parameter and the shooting parameter.

The system 1500 can have an input device 1506 and an output device 1508 communicatively coupled to the computing device 1504. The input device 1506 can be any device or mechanism (e.g., a tag) that can be used to identify the ball or the person dribbling the ball. As an example, the input device 1506 may be worn by a player and wirelessly communicate with the computing device 1504 information that identifies the player or provides other information about the player. In other example, the input device 1506 may be configured to receive manual inputs from the player and wirelessly transmit to the computing device 1504 information submitted by the player, such as information that identifies the player or provides other information about the player. The identification process using the input device 1506 may occur automatically during the initialization of the system 1500 or may require one or more actions by the person such as standing in a predefined location or performing a predetermined action. The output device 1508 can be a display screen or other similar output device that can provide the person with training or other information associated with a shooting motion, a dribbling motion, a passing motion, and/or a dribble-to-pass transition (e.g., a dribbling sequence to be repeated followed by a passing action to be performed) and the results of the training or testing process.

In one embodiment, the input device 1506 and the output device 1508 are integrated into a single apparatus, such as a smartphone or other mobile device. Before gameplay or training, a user may use such apparatus to input information and thereafter to receive feedback from the computing device 1504 indicative of performance results or other training information.

The computing device 1504 can be communicatively coupled to a lighting system 1510 to control the lighting effects (e.g., brightness and direction of light) in the area where the person is dribbling the ball. In one embodiment, the lighting system 1510 can include one or more light sources 1511. The light sources 1511 may include an incandescent bulb, a light emitting diode (LED), or a fluorescent light that is assembled into a lamp or lighting fixture. Yet other types of light sources 1511, including light sources providing light or radiation that is not visible to the human eye (e.g., infrared or ultraviolet light sources) are possible in other embodiments. Depending on the type of light source 1511 that is used, the cameras 1502 can be selected and/or configured to detect the light or radiation from the corresponding light source 1511. For example, if a light source 1511 provides infrared radiation, the camera 1502 can be equipped with an infrared sensor to detect the infrared radiation from the light source 1511.

The computing device 1504 can be used to control the lighting state (e.g., the on-state or the off-state), the lighting output aperture position (e.g., all light can exit or a reduced quantity of light can exit), and/or the lighting output intensity (e.g., a high intensity output or a low intensity output) of the light sources 1511 of the lighting system 1510. In addition, the light sources 1511 may include one or more reflectors that can be adjusted by the computing device 1504 to change the direction of the light output by the light sources 1511. Further, the lighting system 1510 may include one or more mechanisms (e.g., a track and motorized trolley) for the light sources 1511 to permit the position and/or orientation of the light sources 1511 to be adjusted by the computing device 1504. The computing device 1504 may be configured to submit to the lighting system 1510 commands for controlling the states of the light sources 1511 based on an analysis of the images received from the cameras 1502 by the computing device 1504 in an effort to achieve more optimal lighting conditions for analyzing the captured images.

The system 1500 can also include calibration markers 1512, such as LED (light emitting diode) lights designed to emit light at a specific color or objects that have been colored a specific color, which the computing device 1504 can use in calibrating (or re-calibrating) the camera data from the cameras 1502. The calibration markers 1512 can be identified in an image and used as a reference point that corresponds to a known location. To facilitate identification of the markers 1512, the color of the markers can be set to a predefined color (which may be a color rarely found in the natural environment) for which the computing device 1504 searches in the images received from the cameras 1502. Once the computing device finds the markers 1512 in the received images, the computing device 1504 can then use the markers 1512 as reference points when calibrating camera data from different cameras 1502. By having known reference points within the images, the computing device 1504 is able to identify the pixels in different sets of camera data from the cameras 1502 that are showing the same "items" from different fields of view based on the recognition of the known reference point in the different images. In one embodiment, the calibration markers 1512 can be incorporated as light sources 1511 in the lighting system 1510. In other embodiments, other types of markers, such as court markings can be used as known reference points.

In one example, assume that multiple cameras 1502 simultaneously capture an image of a ball that is analyzed by the computing device 1504. Using the markers 1512 in each of the images from the different cameras 1502, the computing device 1504 can correlate the pixel representing one physical location in one image from one camera 1502 with a pixel representing the same physical location in another image from another camera 1502. That is, the pixel coordinates from multiple cameras can be synchronized to a global coordinate system using the markers 1512 as references. Thus, the location of the ball at a given instant can be accurately determined in space relative to the global coordinate system using any of the images captured by any of the cameras 1502. Therefore, as the ball moves in and out of the views of the multiple cameras (e.g., the ball may be shielded from view of one camera 1502 while visible to another camera 1502 as a player changes dribbles or turns his body), the location of the ball relative to the global coordinate system at any given instant can be accurately determined from the images by the computing device 1504 as long as the ball is in the field of view of at least one camera 1502. Thus, over time, the location of the ball can be accurately and consistently tracked with multiple cameras 1502 as the ball comes in and out of the camera views.

One or more sensors 1514, such as accelerometers or other similar types of sensors, can provide position, movement and/or acceleration information to the computing device 1504 for use in determining dribbling motions, dribbling characteristics, passing motions, passing characteristics, transition motions and/or transition characteristics. In one embodiment, the sensors 1514 can be incorporated into the ball and/or attached to or included with the person shooting, dribbling and/or passing the ball, and information from the sensors 1514 can be wirelessly transmitted to the computing device 1504. In a further embodiment, sensors 1514 can also include one or more biometric sensors (e.g., a heart rate monitor or pulse oximeter) that can measure the physical performance of the person shooting, dribbling or passing the ball.

The playing area 1516 can have one or more sensors, which may include sensors 1514, and/or one or more cameras 1502 that can provide information on the person and the shooting, dribbling and/or passing motion (including the dribble-to-pass transition) to the computing device 1504. For example, the playing area 1516 can have one or more sensors embedded in the floor or walls of the playing area 1516, positioned around the perimeter of the playing area 1516, positioned on equipment (e.g., a basketball goal, net or backboard) in the playing area 1516 or otherwise associated with the playing area 1516. The sensors can include any combination of optical sensors, proximity sensors, infrared sensors, magnetic sensors, touch sensors, height sensors, temperature sensors, pressure sensors or any other appropriate type of sensor. The sensors used with playing area 1516 can provide information on the location of the person in the playing area 1516 and the location and movement of the ball in the playing area 1516 based on the signals provided by the sensors.

In one embodiment, the playing area 1516 can be a bounded area having walls located on one (or more) sides of the playing area 1516 to prevent the ball from leaving the playing area 1516 while the system 1500 is tracking the dribbling motion. In addition, the walls of the playing area 1516 can be used in the evaluation of the passing performance of the user, which can include the transition from a dribbling motion to a passing motion. The walls of the playing area 1516 can incorporate one or more sensors (e.g., pressure sensors, proximity sensors, etc.). In one embodiment, the sensors can be embedded in the wall and/or located behind the wall to detect for contact by the ball, which contact can indicate a pass has been attempted by the user. In order to evaluate the passing performance of a user, the system 1500 may display a target on one of the walls and the user can be required to "hit" the target with a pass. In one embodiment, multiple targets may be displayed to the user and the user can be required to select the "proper" target to receive the pass. The system 1500 can evaluate the passing performance of the user (including the selection of the proper target) during both a dribbling motion by the user and a non-dribbling motion by the user (e.g., the user is holding the ball).

The system 1500 can evaluate the dribbling performance, the transition from the dribbling motion to the passing motion (if the user is dribbling) and/or the passing performance of the user. For example, the system 1500 can then determine and evaluate how quickly the user completed the transition and the passing motion (e.g., the time between when the target is displayed on the wall and when the ball contacts the wall) and how accurate the user was with the pass (e.g., the distance between the location of the target and the location of the ball when the ball contacts the wall).

The target can be either located at fixed position on the wall to provide a "fixed" target to the user or moved horizontally and/or vertically along the wall to provide a "moving" target to the user. When the target is displayed on the wall to the user, the user can execute a passing motion to attempt to pass the ball such that the ball arrives at the same location as the target. The system 1500 can then evaluate the passing motion and determine where the ball contacted the wall relative to the target using the sensors and/or cameras 1502. In one embodiment, the target displayed on the wall can be a dot, a circle or bubble. The target can be displayed via lights (e.g., LEDs) located in or behind in the wall of the playing area 1516 or with projectors associated with the playing area 1516. In another embodiment, the target may be an image of a person displayed on the wall by a projector or other device. In still a further embodiment, as described in more detail below, the target may not be displayed on the wall and may be presented to the user via an augmented reality system.

The computing device 1504 can be communicatively coupled to a network 1518, such as a local area network (LAN) or wide area network (WAN), to permit the computing device 1504 to communicate with remote storage systems 1520 and remote devices 1522. In one embodiment, the network 1518 can be the Internet. The remote storage systems 1520 can be used to remotely store camera data, dribbling motion and characteristic information, passing motion and characteristic information, transition information and other information generated and/or obtained by the computing device 1504. The remote device 1522 can be used to display camera data, dribbling motion and characteristic data, passing motion and characteristic information and/or transition information generated or obtained by the computing device 1504. In one embodiment, the remote device 1522 can be a hand-held device such as a smartphone or tablet computer. In another embodiment, the remote device 1522 can be used in place of the output device 1508.

The computing device 1504 can communicate wirelessly, i.e., via electromagnetic or acoustic waves carrying a signal, with the other components of the system 1500, but it is possible for the computing device 1504 to communicate with the other components of the system 1500 over a conductive medium (e.g., a wire), fiber, or otherwise. In one embodiment, one or more of the system components (besides the computing device 1504) can communicate directly with one another (without having to communicate with the computing device 1504) over a wireless or wired connection. For example, each of the cameras 1502 may communicate directly with one another to synchronize a start time of the cameras 1502 or otherwise to synchronize the cameras 1502 or the data captured by the cameras 1502. In another example, a camera 1502 may communicate directly with lighting system 1510 to change lighting conditions when the camera 1502 detects less than optimal lighting conditions.

In one embodiment, the cameras 1502 and the light sources 1511 of the lighting system 1510 can be stationary. However, in other embodiments, one or more of the cameras 1502 and the light sources 1511 may be portable. Each of the cameras 1502 and the light sources 1511 may be positioned at a specific location relative to the athletic playing surface.

One or more of the cameras 1502 may be automatically rotated or pivoted either horizontally and/or vertically in order to adjust the field of view of the camera 1502 without changing the location of the camera 1502. Similarly, one or more of the light sources 1511 of the lighting system 1510 may be automatically rotated or pivoted either horizontally and/or vertically in order to adjust the output direction of the light source 1511 without changing the location of the light source 1511. In one embodiment, the rotating or pivoting of the cameras 1502 and/or light sources 1511 may be pre-programmed into the cameras 1502 and/or light sources 1511 such that the cameras 1502 and/or light sources 1511 are rotated or pivoted according to a predetermined sequence. In another embodiment, the rotating or pivoting of the cameras 1502 and/or light sources 1511 may be in response to instructions provided to the cameras 1502 and/or light sources 1511 by a user, the computing device 1504, or other device.

Figure 2:
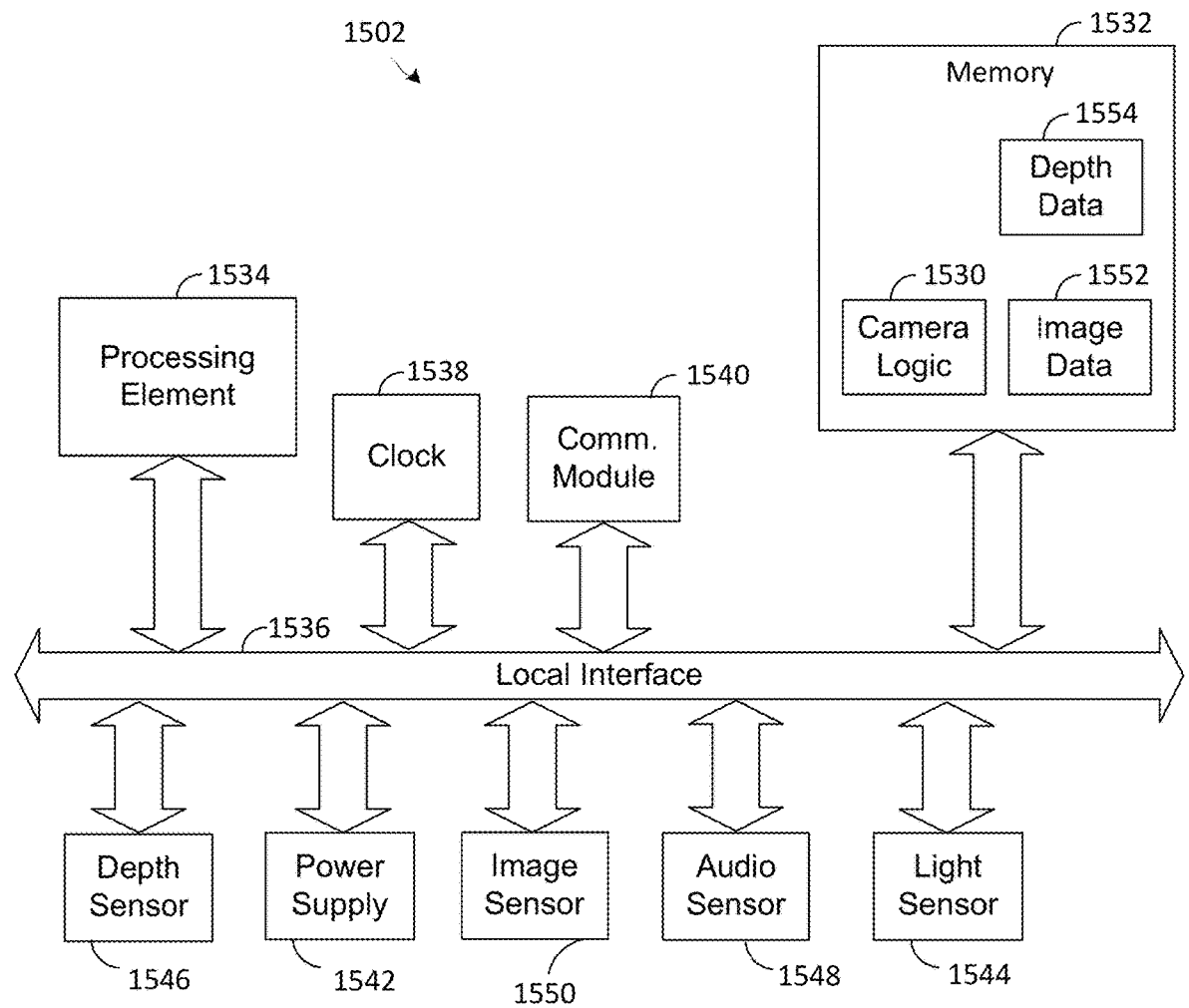
FIG. 2 is a block diagram of an embodiment of a camera used in the tracking system of FIG. 1.

FIG. 2 shows an embodiment of a camera 1502 that can be used with the tracking system 1500. The camera 1502 shown in FIG. 2 can include logic 1530, referred to herein as "camera logic," which may be implemented in software, firmware, hardware, or any combination thereof. In FIG. 2, the camera logic 1530 is implemented in software and stored in memory 1532. However, other configurations of the camera logic 1530 are possible in other embodiments. The camera logic 1530, when implemented in software, can be stored and transported on any computer-readable medium for use by or in connection with an instruction execution apparatus that can fetch and execute instructions.

The embodiment of the camera 1502 shown in FIG. 2 can include at least one conventional processing element 1534, which can incorporate processing hardware for executing instructions stored in the memory 1532. As an example, the processing element 1534 may include a central processing unit (CPU), a digital signal processor (DSP), a graphic processing unit (GPU) and/or a quantum processing unit (QPU). The processing element 1534 can communicate to and drive the other elements within the camera 1502 via a local interface 1536, which can include at least one bus. The camera 1502 can have a clock 1538, which can be used to track time and synchronize operations with the other cameras 1502.

The camera 1502 can have a communication module 1540. The communication module 1540 can include a radio frequency (RF) radio or other device for communicating wirelessly with computing device 1504 or other components of system 1500. The power supply 1542 has an interface that allows it to plug into or otherwise interface with an external component, such as a wall outlet or battery, and receive electrical power from the external component.

As shown by FIG. 2, the camera 1502 can also include an image sensor 1550, a depth sensor 1546, an audio sensor 1548 and a light sensor 1544. The image sensor 1550 can be used to record, capture or obtain images or videos of the area surrounding or in proximity to the camera 1502. In one embodiment, the image sensor 1550 is configured to capture two dimensional (2-D) video images of the playing area including images of the object being dribbled or passed, the person performing the dribbling or passing and any other players in the athletic playing area. The depth sensor 1546 can be used to determine a relative distance (with respect to the depth sensor 1546) of objects in the field of view of the camera 1502. The audio sensor 1548 or microphone can be used to record sound or noise occurring in the area surrounding or in proximity to the camera 1502. The light sensor 1544 can be configured to sense ambient light in the area surrounding the camera 1502.

The image sensor 1550 can include one or more CCDs (charge coupled devices) and/or one or more active pixel sensors or CMOS (complementary metal-oxide-semiconductor) sensors. The images or videos from the image sensor 1550 can be stored as image data 1552 in memory 1532. In one embodiment, the image data 1552 may define frames of the captured images. The image data 1552 can be stored in any appropriate file format, including, but not limited to, PNG (portable network graphics), JPEG (joint photographic experts group), TIFF (tagged image file format), MPEG (moving picture experts group), WMV (Windows media video), QuickTime and GIF (graphics interchange format). The sound recordings from audio sensor 1548 may be incorporated into the video file from the image sensor 1550 and stored in image data 1552. If the sound recording from the audio sensor 1548 is not part of the video file, then the sound recording can be stored in any appropriate file format, including, but not limited to, WAV (waveform audio), MP3 (MPEG Layer III Audio), WMA (Windows media audio) and MPEG and saved in image data 1552 or elsewhere in memory 1532.

In one embodiment, for each frame of image data 1552, the depth sensor 1546 can provide a depth map indicating a respective depth for each pixel of the image frame. The depth maps provided by the depth sensor 1546 can be stored as depth data 1554 in memory 1532. Note that the depth sensor 1546 may be oriented such that the distance measured by the depth sensor 1546 is in a direction that is substantially normal to the plane of the 2D coordinate system used by the image sensor 1550, although other orientations of the depth sensor 1546 are possible in other embodiments.

From time-to-time, the camera logic 1530 can be configured to transmit the image data 1552 and the depth data 1554 to the computing device 1504. The image data 1552 and the depth data 1554 may be analyzed by the computing device 1504 to track the dribbling motion of the ball and determine one or more dribbling characteristics from the dribbling motion, to track a passing motion with the ball and determine one or more passing characteristics from the passing motion or to track a dribble-to-pass transition with the ball and determine one or more transition characteristics. The image data 1552 and the depth data 1554 can be time-stamped based on the time indicated by the clock 1538 in order to indicate when the image data 1552 and the depth data 1554 were obtained. Thus, upon receiving the image data from multiple cameras 1502, the computing device 1504, based on the timestamps, can determine which image frames from multiple cameras 1502 were captured at substantially the same time in order to facilitate tracking of ball movement. From time-to-time, the cameras 1502 may communicate with each other and/or the computing device 1504 in order synchronize their clocks so that a comparison of a timestamp for an image frame from one camera 1502 with a timestamp for an image frame of another camera 1502 accurately indicates the time difference that the two image frames were captured. The image data 1552 and the depth data 1554 may be presented to a user for analysis or review.

Various types of image sensors 1550 and depth sensors 1546 may be used in camera 1502. In one embodiment, the camera 1502 can be implemented using a KINECT® camera system sold by Microsoft Corporation. In such a camera, the image sensor 1550 and depth sensor 1546 are integrated into the same housing. The image sensor 1550 is configured to capture a video stream comprising frames of video data in which each frame is defined by a plurality of pixels. Each pixel is associated with two coordinates, an x-coordinate and a y-coordinate, representing a location in 2D space. For each frame, each pixel is assigned a color value (which may include a red component (R) value, a blue component (B) value, and a green component (G) value) indicative of the color of light received by the image sensor 1550 from the location in 2D space corresponding to the pixel's coordinates. Further, for each pixel, the depth sensor 1546 measures the distance from the depth sensor 1546 to the real world object that is at the pixel's corresponding location in 2D space. The distance (which, as described above, may be in a direction substantially normal to the plane of the 2D coordinate system used by the image sensor 1550) may be referred to as the "depth" of the corresponding pixel. Using the image data 1552 from the image sensor 1550 and the depth data 1554 from the depth sensor 1546, the location of an object captured by the image sensor 1550 can be determined in 3D space. That is, for a point on the object, its x-coordinate and y-coordinate from the image data 1552 provided by the image sensor 1550 indicate its location along two axes (e.g., the x-axis and y-axis), and the point's depth value from the depth sensor 1546, which may be referred to as the "z-coordinate," indicates its location along a third axis (e.g., the z-axis). Notably, the coordinate system defined by the three axes is not necessarily relative to gravity. That is, depending on the orientation of the camera 1502, gravity may be in any direction relative to the axes of the coordinate system. Thus, unless a calibration process is performed, the direction of gravity relative to the coordinate system may be unknown. An example of a calibration process for determining the direction of gravity relative to the coordinate system is described by: U.S. Pat. No. 9,734,405, entitled "Systems and Methods for Monitoring Objects in Athletic Playing Spaces" and issued on Aug. 15, 2017, which is incorporated herein by reference. (Suggest adding a similar paragraph mentioning the Intel RealSense depth sensor. https://software.intel.com/en-us/realsense/d400)

In one embodiment, the depth sensor 1546 has a wave emitter (e.g., an infrared laser projector or other type of emitter) and a wave sensor for sensing reflections of the energy emitted by the wave emitter. The wave emitter emits infrared radiation at various wavelengths into free space, although radiation at other wavelengths outside of the infrared spectrum (e.g., visible light) may be emitted in other embodiments, and the wave sensor senses the reflected energy to capture a video stream having frames of video data. Each frame of the depth data 1554 from the sensor 1546 corresponds to a respective frame of image data 1552 from the image sensor 1550. Further, a pixel of a frame of the depth data 1554 corresponds to (e.g., has the same x- and y-coordinates) and indicates the depth for at least one corresponding pixel in the image data 1552 from image sensor 1550. In another embodiment, the depth sensor 1546 can use a stereoscopic camera to capture depth data 1554.

In this regard, for a frame of video data captured by the depth sensor 1546, the depth sensor 1546 converts the frame to a depth map by assigning each pixel a new color value (referred to herein as "depth value") representative of the pixel's depth. Thus, when the depth map is displayed, objects displayed as the same color within the image should be approximately the same distance away from the depth sensor 1546, noting that it is often unnecessary for the depth map to actually be displayed during operation.

As described above, a given pixel of the image data 1552 from the image sensor 1550 is associated with an x-coordinate and y-coordinate indicative of the pixel's location in 2D space, and the pixel is associated with a depth value from a corresponding pixel in the depth data 1554 provided by the depth sensor 1546 indicative of the pixel's z-coordinate. The combination of the x-coordinate, y-coordinate, and z-coordinate defines the pixel's location in 3D space relative to the coordinate system of the image sensor 1550. That is, the x-coordinate, y-coordinate, and z-coordinate define the location of the point from which light measured for the pixel was reflected toward the image sensor from an object.

Figure 3:
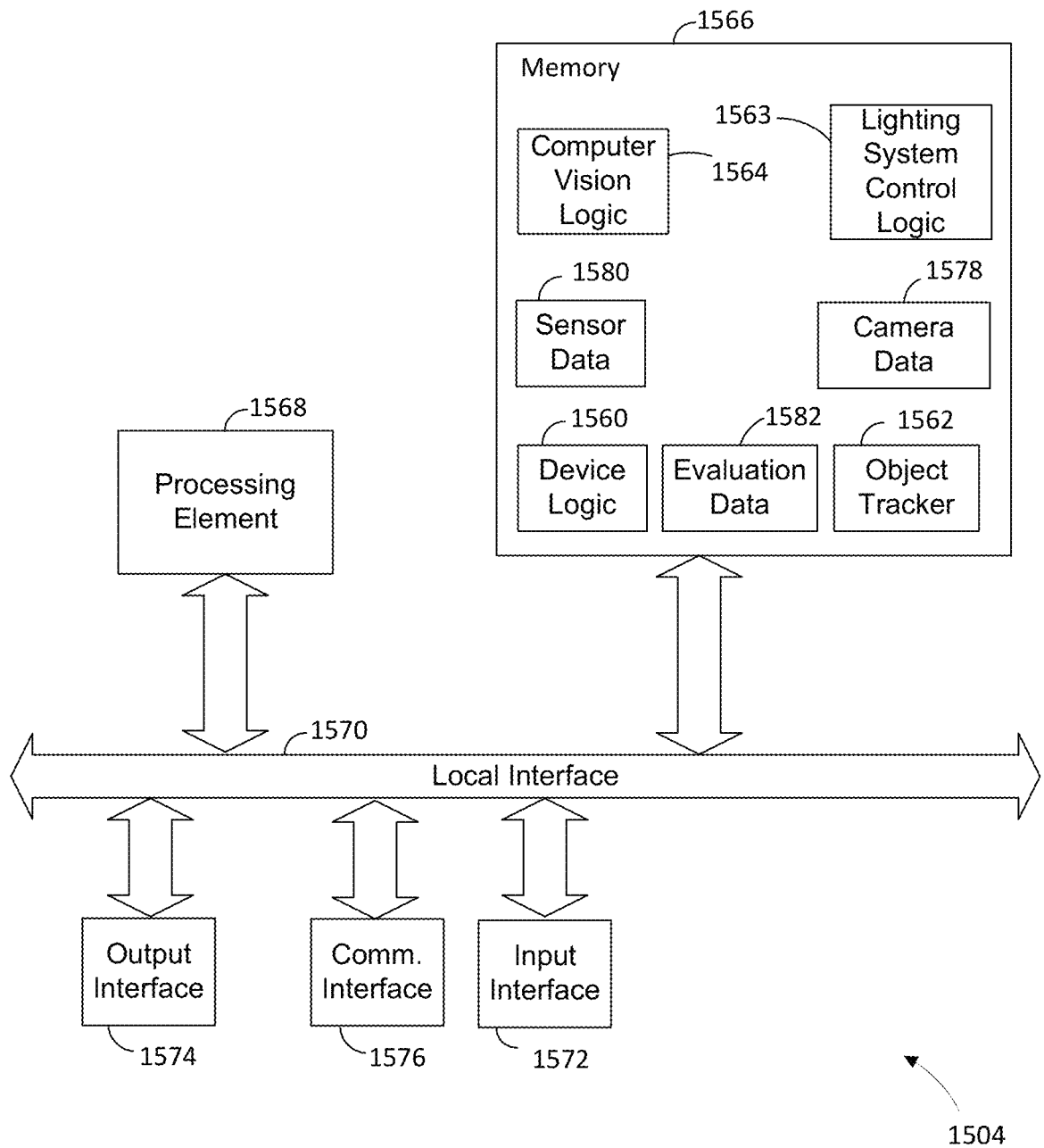
FIG. 3 is a block diagram of an embodiment of a computing device used in the tracking system of FIG. 1.

FIG. 3 shows an embodiment of the computing device 1504. The computing device 1504 may be implemented as one or more general or special-purpose computers, such as a laptop, hand-held (e.g., smartphone), desktop, or mainframe computer. The computing device can include logic 1560, referred to herein as "device logic," for generally controlling the operation of the computing device 1504, including communicating with the other components of the system 1500. The computing device 1504 also includes logic 1562, referred to herein as an "object tracker," to determine the position and movement of the object, the person handling the object, and any other persons in the athletic playing area and lighting system control logic 1563 to control the lighting system 1510 and the light sources 1511. The computing device 1504 further includes logic 1564, referred to herein as "computer vision logic," for processing and analyzing the image data 1552 and the depth data 1554 from the cameras 1502. The device logic 1560, the computer vision logic 1564, lighting system control logic 1563 and the object tracker 1562 can be implemented in software, hardware, firmware or any combination thereof. In the computing device 1504 shown in FIG. 3, the device logic 1560, the computer vision logic 1564, lighting system control logic 1563 and the object tracker 1562 are implemented in software and stored in memory 1566 of the computing device 1504. Note that the device logic 1560, the computer vision logic 1564, lighting system control logic 1563 and the object tracker 1562, when implemented in software, can be stored and transported on any non-transitory computer-readable medium for use by or in connection with an instruction execution apparatus that can fetch and execute instructions.

The computing device 1504 can include at least one conventional processing element 1568, which has processing hardware for executing instructions stored in memory 1566. As an example, the processing element 1568 may include a central processing unit (CPU), a digital signal processor (DSP), a graphic processing unit (GPU) and/or a quantum processing unit (QPU). The processing element 1568 communicates to and drives the other elements within the computing device 1504 via a local interface 1570, which can include at least one bus. Furthermore, an input interface 1572, for example, a keypad, keyboard or a mouse, can be used to input data from a user of the computing device 1504, and an output interface 1574, for example, a printer, monitor, liquid crystal display (LCD), or other display apparatus, can be used to output data to the user. In one embodiment, the input interface 1572 and the output interface 1574 can correspond to input device 1506 and output device 1508, respectively. Further, a communication interface 1576 may be used to exchange data among the components of the system 1500 or with network 1518 as shown in FIG. 1.

As shown by FIG. 3, sensor data 1580, evaluation data 1582 and camera data 1578 can be stored in memory 1566 at the computing device 1504. The camera data 1578 can include image data 1552 and depth data 1554 from cameras 1502. The sensor data 1580 can include data and measurements from sensors 1514 (e.g., accelerometers or other sensors) and/or any sensors incorporated in the playing area 1516. The camera data 1578, the sensor data 1580 and the evaluation data 1582 can be used and/or analyzed by device logic 1560, computer vision logic 1564 and/or object tracker 1562 to track the dribbling motion of an object and determine one or more characteristics of the dribbling motion, to track a transition from a dribbling motion to a passing motion and determine one or more parameters associated with characteristics of the transition, to track a shooting motion of the object and determine one or more characteristics of the shooting motion, to track a transition from the dribbling motion to shooting motion and determine one or more parameters associated with characteristics of the transition, and to track a passing motion with an object and determine one or more parameters associated with characteristics of the passing motion.

The evaluation data 1582 can include information associated with one or more parameters associated with dribbling characteristics, one or more parameters associated with shooting characteristics, one or more parameters associated with transition characteristics and/or one or more parameters associated with passing characteristics, such as, for example, the movements associated with particular dribbling types or the movements associated with particular pass types. The evaluation data 1582 can also include training information such as diagrams and videos that can be displayed on output device 1508 to provide training instructions on "proper" shooting form and/or technique, "proper" dribbling form and/or technique and/or "proper" passing form and/or technique to a user. The evaluation data 1582 may include one or more testing procedures based on "proper" shooting form, dribbling form and/or passing form that can be used to evaluate the shooting, dribbling and/or passing motion (including a transition from a dribbling motion to a passing motion) associated with a user. In one embodiment, the testing procedures can be displayed to the user on the output device 1508, and the object tracker 1562 can evaluate a user's performance with respect to the testing procedure in evaluation data 1582 based on the user's shooting motion, dribbling motion and/or passing motion captured in camera data 1578.

The object tracker 1562 can receive camera data 1578, sensor data 1580, information from computer vision logic 1564 and/or other information relating to the ball and the person dribbling the ball to track the dribbling motion and determine one or more characteristics of the dribbling motion. Once a characteristic of the dribbling motion has been determined, the object tracker 1562 can compare the determined dribbling characteristic(s) to corresponding "proper" dribbling characteristic information in evaluation data 1582 to score or otherwise evaluate the determined dribbling characteristic(s). The "proper" dribbling characteristics stored in evaluation data 1582 can be preselected parameters or techniques that are associated with a preferred dribbling motion. In one embodiment, each determined dribbling characteristic can have a corresponding "proper" dribbling characteristic stored in evaluation data 1582. The proper dribbling characteristic may be a predetermined number such as a predetermined speed, a predetermined number of dribbles per minute or a predetermined number of turnovers. The proper dribbling characteristics may also be defined relative to the body of the person performing the dribbling (e.g., the dribble height should not exceed the waist of the person dribbling the ball). Further, the proper dribbling characteristics may be defined relative to actions of the person dribbling the ball (e.g., there may be one set of proper dribbling characteristics when the person is running and a different set of proper dribbling characteristics for when the person is walking or stationary). However, in other embodiments, some dribbling characteristics may not have a corresponding "proper" dribbling characteristic. In still other embodiments, the "proper" dribbling characteristic may be defined as a range (e.g., greater than a predetermined minimum, less than a predetermine maximum, or between a predetermined minimum and a predetermined maximum).

The object tracker 1562 can also receive camera data 1578, sensor data 1580, information from computer vision logic 1564 and/or other information relating to the ball and the person passing the ball to track the transition from the dribbling motion to the passing motion (if applicable) and/or the passing motion and determine one or more characteristics of the transition and/or the passing motion. Once a characteristic of a transition from dribbling to passing and/or the passing motion has been determined, the object tracker 1562 can compare the determined transition characteristic(s) and/or passing characteristic(s) to corresponding "proper" transition and/or passing characteristic information in evaluation data 1582 to score or otherwise evaluate the determined transition and/or passing characteristic(s).

The "proper" transition characteristics stored in evaluation data 1582 can be preselected parameters or techniques that are associated with a preferred transition from a dribbling motion to a passing motion. In one embodiment, each determined transition characteristic can have a corresponding "proper" transition characteristic stored in evaluation data 1582. The proper transition characteristic may be a predetermined number such as a predetermined time, a predetermined ball position or a predetermined number of turnovers. The proper transition characteristics may also be defined relative to the body of the person performing the transition (e.g., the ball position should not exceed the chest of the person passing the ball). Further, the proper transition characteristics may be defined relative to actions of the person completing the transition (e.g., there may be one set of proper transition characteristics when the person is dribbling while running and a different set of proper transition characteristics when the person is dribbling while walking or being stationary). However, in other embodiments, some transition characteristics may not have a corresponding "proper" transition characteristic. In still other embodiments, the "proper" transition characteristic may be defined as a range (e.g., greater than a predetermined minimum, less than a predetermine maximum, or between a predetermined minimum and a predetermined maximum).

The "proper" passing characteristics stored in evaluation data 1582 can be preselected parameters or techniques that are associated with a preferred passing motion. In one embodiment, each determined passing characteristic can have a corresponding "proper" passing characteristic stored in evaluation data 1582. The proper passing characteristic may be a predetermined number such as a predetermined speed, a predetermined pass height or a predetermined number of turnovers. The proper passing characteristics may also be defined relative to the body of the person performing the passing (e.g., the pass height should not exceed the chest of the person passing the ball). Further, the proper passing characteristics may be defined relative to actions of the person passing the ball (e.g., there may be one set of proper passing characteristics when the person is running and a different set of proper passing characteristics for when the person is walking or stationary). However, in other embodiments, some passing characteristics may not have a corresponding "proper" passing characteristic. In still other embodiments, the "proper" passing characteristic may be defined as a range (e.g., greater than a predetermined minimum, less than a predetermine maximum, or between a predetermined minimum and a predetermined maximum).

The "proper" shooting parameters associated with shooting characteristics stored in evaluation data 1582 can be preselected parameters or techniques that are associated with a preferred shooting motion. In one embodiment, each determined shooting characteristic can have a corresponding "proper" shooting characteristic stored in evaluation data 1582. The proper shooting characteristic may be a predetermined number such as a predetermined speed, a predetermined angle or a predetermined linear dimension. The proper shooting characteristics may also be defined relative to the body of the person performing the shooting (e.g., the feet of the person should be pointing at the hoop). Further, the proper shooting characteristics may be defined relative to actions of the person shooting the ball (e.g., there may be one set of proper shooting characteristics when the person is moving and a different set of proper shooting characteristics for when the person is stationary). However, in other embodiments, some shooting characteristics may not have a corresponding "proper" shooting characteristic. In still other embodiments, the "proper" shooting characteristic may be defined as a range (e.g., greater than a predetermined minimum, less than a predetermine maximum, or between a predetermined minimum and a predetermined maximum).

The computer vision logic 1564 can be used to analyze and process the image data 1552 and depth data 1554 from the cameras 1502 stored in camera data 1578. The computer vision logic 1564 can extract information from the image data 1552 and depth data 1554 in camera data 1578 using models, theories and other techniques to identify or recognize the object to be tracked and one or more participants (including the torso, arms, legs, hands, feet, etc., of the participants) involved in the athletic event associated with the object. The computer vision logic 1564 can use numerous techniques to identify or recognize objects and people such as content-based image retrieval, pose estimation, optical character recognition, 2D code reading, shape recognition, facial recognition, object recognition, pattern recognition and any other appropriate identification or recognition technique. Exemplary techniques for identifying and tracking players are disclosed in U.S. patent application Ser. No. 15/438,289, entitled "Systems and Methods for Monitoring Objects at Sporting Events" and filed on Feb. 21, 2017, which is incorporated herein by reference.

In one embodiment, the computer vision logic 1564 can perform one or more of the following techniques and/or processes on the image data 1552 and depth data 1554 data from camera data 1578: pre-processing; feature extraction; detection/segmentation; high-level processing; and decision making. The pre-processing of the camera data 1578 can involve the processing of the data to confirm that the data is in the proper form for subsequent actions. Some examples of pre-processing actions can include noise reduction and contrast enhancement. After the camera data 1578 has been pre-processed, the camera data 1578 can be reviewed or analyzed to extract features (e.g., lines, edges, corners, points, textures and/or shapes) of various complexity from the camera data 1578. Next, in the detection/segmentation step, decisions can be made regarding the features and/or regions that are relevant and require additional processing. The high-level processing of the reduced set of camera data 1578 (as a result of the detection/segmentation step) involves the estimation of specific parameters (e.g., object size) and classifying of a detected object into categories. Finally, the decision making step makes a determination of the identity of the detected object or person or indicates that the detected object or person is not known.

The computer vision logic 1564 can identify objects and persons that are present in the camera data 1578 by processing the individual images and videos received from a camera 1502 and/or any combined or grouped images and videos based on camera data 1578 from multiple cameras 1502. The computer vision logic 1564 can identify objects or persons using labels carried by the objects or persons, facial recognition techniques (if identifying a person), profiling techniques (using the profile of the object or person) or any other suitable recognition techniques.

In one embodiment, the object or person can have a label that is attached or affixed to the object or person and that can be recorded by cameras 1502. If the person is carrying a tag, the label can be (but does not have to be) incorporated into the tag carried by the person. The computer vision logic 1564 can identify the label attached to the object or person and then identify the object or person based on stored information in memory 1566 correlating each label to an object or person. In another embodiment, the computer vision logic 1564 can identify a person using facial recognition or can identify an object or a person by using a distinguishable or identifiable profile or feature of the object or person. For example, the identification of a circular or spherical shape may indicate the presence of the ball in the frame. Similar to the process for identifying an object or person using a label, the computer vision logic 1564 can identify facial features and/or other profiles or features of the object or person in the camera data 1578 and then compare the identified facial features and/or other profiles or features of the asset to stored information in memory 1566 correlating information on features and/or profiles to an object or person.

The computer vision logic 1564 can send the camera data 1578 and/or information on the identified object or person from analyzing the camera data 1578 to the object tracker 1562. The object tracker 1562 can use information on the identified object and/or persons from the computer vision logic 1564 to determine a dribbling motion for the object and one or more dribbling parameters associated with the dribbling motion, a transition from a dribbling motion to a passing motion and one or more parameters associated with the transition, a shooting motion for the object and one or more shooting parameters associated with the shooting motion, a transition from a dribbling motion to a shooting motion and one or more parameters associated with the transition or a passing motion with the object and determine one or more passing parameters associated with the passing motion. In one embodiment, the object tracker 1562 can use synchronized and calibrated camera data 1578 to determine a dribbling motion and corresponding dribbling characteristics, a dribble-to-pass transition and corresponding transition parameters, a shooting motion and corresponding shooting parameters, a dribble-to-shot transition and corresponding transition parameters or a passing motion and corresponding passing parameters. The synchronization and calibration of the camera data 1578 can be done by the computer vision logic 1564 or the object tracker 1562.

The synchronization of the camera data 1578 involves ensuring that the corresponding "frames" of camera data 1578 processed by the computer vision logic 1564 or the object tracker 1562 for a give sample were captured substantially at the same time. In this regard, a sample generally refers to data from measurements that were taken substantially at the same time. For example, at a given instant, an image of the ball may be captured by multiple cameras 1502. Further, the ball's position may be calculated from each of the images. Since the position data from the multiple cameras is based on image data captured substantially at the same time in such example, the measured positions are part of the same sample. In order to determine which frames were captured substantially at the same time, a global time system may be defined. As an example, the computing device 504 may maintain a global time system and adjust the timestamps from each of the cameras 1502 according to the global time system so that the timestamps are synchronized. That is, image captured at the same time should have the same adjusted timestamp. Alternatively, the computing device 1504 (or other device maintaining a global time system) may from time-to-time transmit timing information to the cameras 1504. The cameras 1504 may then use such information to adjust their respective clocks so that images having the same timestamps from the cameras 1504 were captured substantially at the same time. Alternatively, the computing device 1504 may analyze unsynchronized timestamps from the cameras 1502 and determine which frames were captured substantially at the same time. In such embodiment, the computing device 1504 may communicate with the cameras 1504 in a controlled calibration process in order to assess timing differences between the cameras 1504. As an example, each camera 1504 may report a current timestamp to the computing device in a handshake process so that the computing device 1504 can determine the camera's time relative to a global time system maintained by the computing device 1504 or otherwise. In other embodiments, other techniques for synchronizing the camera data are possible.

The calibration of the camera data 1578 involves the correlation of the pixels in an image frame to a global coordinate system such that the computing device 1504 is aware of which pixels in different frames from different cameras 1502 represent the same physical location in space. This may be achieved, for example, by ensuring that the pixels in "frames" from different cameras 1502 representing the same physical location are assigned the same global coordinates. By calibrating the camera data 1578, the object and the person dribbling the object can be tracked through multiple image frames from different cameras 1502 since the location of the object and the person dribbling the object, as defined in the global coordinate system, can be the same in each image frame regardless of the field of view of the camera 1502 capturing the image frame. Once the camera data 1578 is calibrated, the object tracker 1562 can track the object through multiple image frames as the object moves into and out of view individual image frames. If one or more cameras 1502 become misaligned, the calibration process can be repeated to calibrate the misaligned camera(s) 1502.

In one embodiment, the object tracker 1562 can determine a dribbling motion by analyzing successive frames of camera data 1578 to determine changes in the position and/or depth of the identified object and/or changes in the position of the person preforming the dribbling motion. The object tracker 1562 can determine a dribbling motion by detecting a downward trajectory (movement away from the person) of the identified object followed by a change of direction of the identified object (such as may be caused by the object contacting the athletic playing surface) and an upward trajectory (movement toward the person) of the identified object. Some exemplary techniques of calculating the trajectory of a ball that may be used by object tracker 1562 can be found in U.S. Pat. No. 8,908,922 entitled "True Space Tracking of Axisymmetric Object Flight Using Diameter Measurement" and U.S. Pat. No. 8,948,457 entitled "True Space Tracking of Axisymmetric Object Flight Using Diameter Measurement," both of which patents are hereby incorporated by reference. By identifying changes associated with the upward and downward trajectories of the object or the person dribbling the object, the object tracker 1562 can determine characteristics associated with the dribbling motion. In one embodiment, some of the dribbling characteristics can be determined using conventional mathematical and physics principles and equations based on trajectory information extracted from the camera data 1578. The determined dribbling characteristics can then be stored in memory 1566 and/or scored based on "proper" dribbling characteristics stored in evaluation data 1582.

As an example, the object tracker 1562 may analyze the trajectory of the ball and identify a plurality of dribbles. For one or more dribbles, the object tracker 1562 may determine a parameter indicative of a dribbling characteristic, such as ball speed, dribble height, repetition rate, type of dribble, etc., and store such parameters for analysis. In some cases, the object tracker 1562 may correlate a given parameter with information that can be used to characterize dribbling performance. For example, if a given dribble is performed with the left hand, the parameter determined for the dribble may be correlated in memory with a left hand identifier. Based on the parameters correlated with such identifier, the object tracker 1562 may calculate one or more scores or other statistics indicative of the player's performance with his left hand. As an example, an average repetition rate, ball speed, or dribble height for the player's left hand may be calculated. If a dribble type is identified for a particular dribble, as will be described in more detail below, the parameter determined for the dribble may be correlated in memory with a type identifier indicative of the dribble type. Based on the parameters correlated with such identifier, the object tracker 1562 may calculate one or more scores or other statistics indicative of the player's dribbling performance for the identified dribble type. If a particular defender can be identified as guarding the player, as will be described in more detail below, the parameter determined for the dribble may be correlated in memory with an identifier that identifies the defender. Based on parameters correlated with such identifier, the object tracker 1562 may calculate one or more scores or other statistics indicative of the player's dribbling performance against the defender. In other embodiments, the data can be grouped in other ways in order to provide further insight into the player's dribbling performance relative to certain conditions. Any of the parameters, scores, or other statistics described herein may be reported by the system to indicate one or more dribbling characteristics for the tracked player. Any such parameters, scores, or other statistics may be used in order to calculate an overall or combined assessment of the player's dribbling performance that may be reported.

Note that techniques other than or in addition to the identification of objects and/or persons by computer vision logic 1564 may be used by the object tracker 1562 to determine a dribbling motion and one or more characteristics associated with the dribbling motion. In one embodiment, sensor data 1580 may be analyzed by the object tracker 1562 to determine the location and movement of an object and/or person. The sensor data 1580 can then be used to determine dribbling motion and one or more characteristics associated with the dribbling motion.

In another embodiment, the object tracker 1562 can determine a transition from a dribbling motion to a passing motion and/or a passing motion by analyzing successive frames of camera data 1578 to determine changes in the position and/or depth of the identified object, changes in the position of the person initiating the transition and/or passing motion and/or changes in the person in possession of the identified object. The object tracker 1562 can determine a transition from a dribbling motion to a passing motion by detecting an end to an upward/downward trajectory for the identified object followed by the subsequent initiation of a passing motion. The object tracker 1562 can determine a passing motion by detecting a horizontal motion or trajectory (e.g., movement away from the location of the person) of the identified object from a first location on the athletic playing surface followed by a change of person in possession of the identified object at a different location from the first location. By identifying changes associated with the trajectories of the object or the person initiating the passing motion, the object tracker 1562 can determine characteristics associated with the transition and/or the passing motion. In one embodiment, some of the transition characteristics and/or passing characteristics can be determined using conventional mathematical and physics principles and equations based on trajectory information extracted from the camera data 1578. The determined transition and/or passing characteristics can then be stored in memory 1566 and/or scored based on "proper" transition and/or passing characteristics stored in evaluation data 1582.

As an example, the object tracker 1562 may analyze the trajectory of the ball and identify a passing motion or a shooting motion. For each passing motion, the object tracker 1562 may determine a parameter indicative of a passing characteristic, such as ball speed, pass height at initiation, pass height at reception, type of pass, etc., and store such parameters for analysis. For each shooting motion, the object tracker 1562 may determine a parameter indicative of a shooting characteristic, such as ball speed, entry angle, type of shot, etc., and store such parameters for analysis. In some cases, the object tracker 1562 may correlate a given parameter with information that can be used to characterize passing or shooting performance. For example, if a given pass or shot is initiated with the left hand, the parameter determined for the pass or shot may be correlated in memory with a left hand identifier. Based on the parameters correlated with such identifier, the object tracker 1562 may calculate one or more scores or other statistics indicative of the player's performance with his left hand.

As an example, an average pass height at initiation, ball speed, or pass height at reception for the player's left hand may be calculated. If a pass type is identified for a particular passing motion, as will be described in more detail below, the parameter determined for the pass may be correlated in memory with a type identifier indicative of the pass type. Based on the parameters correlated with such identifier, the object tracker 1562 may calculate one or more scores or other statistics indicative of the player's passing performance for the identified pass type.

If a particular defender can be identified as guarding the player, as will be described in more detail below, the parameter determined for the pass or shot may be correlated in memory with an identifier that identifies the defender. Based on parameters correlated with such identifier, the object tracker 1562 may calculate one or more scores or other statistics indicative of the player's passing and/or shooting performance against the defender. In other embodiments, the data can be grouped in other ways in order to provide further insight into the player's passing and/or shooting performance relative to certain conditions. Any of the parameters, scores, or other statistics described herein may be reported by the system to indicate one or more passing and/or shooting characteristics for the tracked player. Any such parameters, scores, or other statistics may be used in order to calculate an overall or combined assessment of the player's passing and/or shooting performance that may be reported.

Note that techniques other than or in addition to the identification of objects and/or persons by computer vision logic 1564 may be used by the object tracker 1562 to determine a shooting motion and/or passing motion and one or more characteristics associated with the shooting motion and/or passing motion. In one embodiment, sensor data 1580 may be analyzed by the object tracker 1562 to determine the location and movement of an object and/or person. The sensor data 1580 can then be used to determine a shooting motion and/or passing motion and one or more characteristics associated with the shooting motion and/or passing motion.

Figure 4:
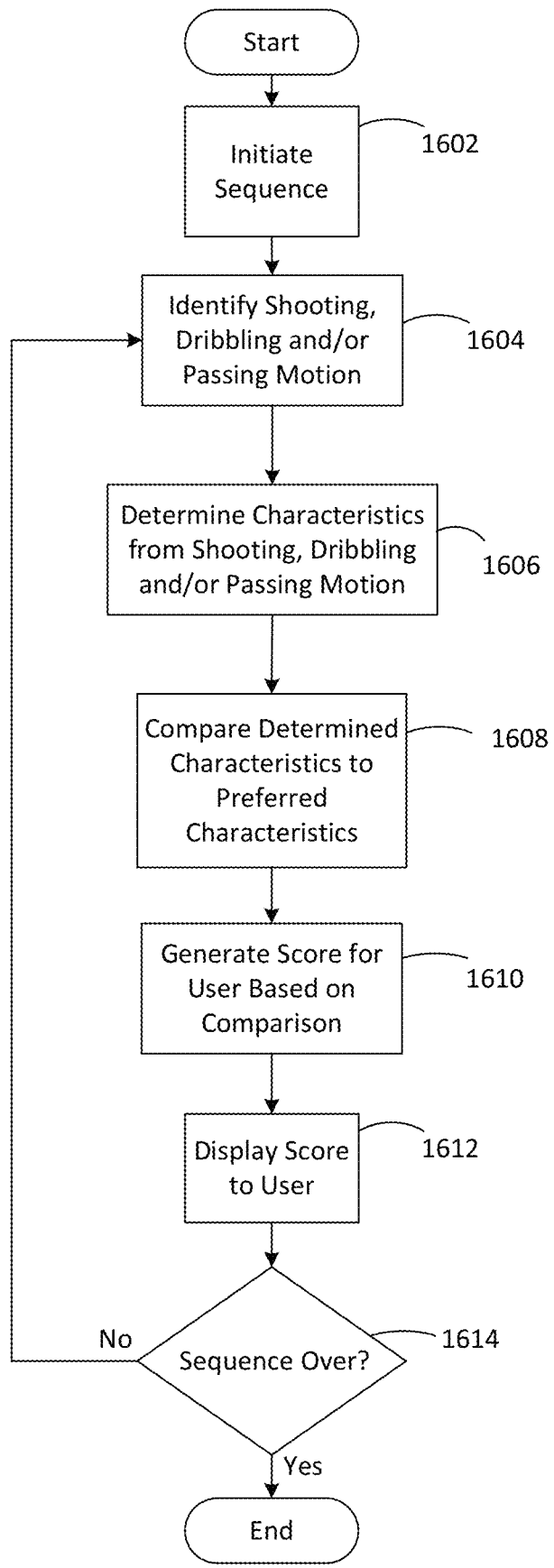
FIG. 4 is an information flow diagram of an embodiment of evaluating a dribbling and/or passing motion during either a training sequence or a game sequence.

FIG. 4 shows an embodiment of a process for evaluating the shooting, dribbling and/or passing motion of a user with the tracking system 1500 during either a training sequence (training mode) or a game sequence (game mode). The process begins with a user initiating either a training sequence or a game sequence with the tracking system 1500 being active (step 1602). If the tracking system 1500 is being used in a training mode, the user can select a desired training sequence from the computing device 1504 using input device 1506. The selected training sequence can then be displayed to the user using output device 1508. The computing device 1504 can store one or more training sequences in evaluation data 1582. The training sequences can provide instruction to the user on how to execute a particular shooting, dribbling and/or passing motion. The training sequences can demonstrate the shooting, dribbling and/or passing motion on the output device 1508 for the user to emulate. The user can then attempt to repeat the demonstrated shooting, dribbling and/or passing motions, which user actions are captured by cameras 1502, during the training sequence. During a game sequence, the cameras 1502 may capture shooting, dribbling and/or passing motions of the user during gameplay. The camera data 1578 from the cameras 1502 can be provided to computing device 1504 and processed by the computer vision logic 1564 to identify the object being shot, dribbled or passed (e.g., the ball), the person performing the shooting, dribbling or passing and, if it is a passing motion, the person receiving the pass. The information from the computer vision logic 1564 can then be provided to the object tracker 1562 to identify the shooting, dribbling and/or passing motion (step 1604) of the user.

The object tracker 1562 can identify the shooting, dribbling and/or passing motion associated with the ball based on the identification information from the computer vision logic 1564, which identifies the ball, and the trajectory of the identified ball (including any corresponding changes in depth or position of the ball). Once the object tracker 1562 has identified the shooting, dribbling and/or passing motion, the object tracker 1562 can identify one or more parameters associated with characteristics of the shooting, dribbling and/or passing motion (step 1606). The object tracker 1562 can identify parameters associated with characteristics of the shooting, dribbling and/or passing motion by analyzing the trajectory of the ball and the camera data 1578 associated with the ball and the person performing the dribbling motion and/or initiating the shooting or passing motion.

The object tracker 1562 can determine the hand(s) of the person (e.g., right hand or left hand) being used to perform the shooting, dribbling and/or passing motion by identifying the face of the person (based on facial recognition data from the computer vision logic 1564) and then determining the side of the person that is associated with the detected shooting, dribbling and/or passing motion. Alternatively, the object tracker 1562 can identify the person's left and right hands based on his body profile within the captured images. In an embodiment, the object tracker 1562 can also determine if a two-handed (e.g., both hands are on the object) shooting motion or passing motion has been performed. In one embodiment, a two-handed pass can originate from the torso (or center) of the person instead of the side of the person. Once the object tracker 1562 has determined the hand of the person performing the dribbling motion (the "dribble hand"), the object tracker 1562 can then determine the dribbling parameters associated with dribbling characteristics for the dribbling motion performed with each hand of the person. Similarly, once the object tracker 1562 has determined the hand(s) of the person performing the passing motion (the "passing hand(s)"), the object tracker 1562 can then determine the passing parameters associated with passing characteristics for the passing motion performed with each hand or both hands of the person. Further, once the object tracker 1562 has determined the hand(s) of the person performing the shooting motion (the "shooting hand(s)"), the object tracker 1562 can then determine the shooting parameters associated with shooting characteristics for the shooting motion performed with each hand or both hands of the person.

The object tracker 1562 can use the information on the dribble hand to determine several types of dribbling motions (e.g., cross-over dribbles, behind-the-back dribbles, or between-the-leg dribbles). The object tracker 1562 can review information from computer vision logic 1564 and dribble hand information to determine if a particular dribbling motion has been performed. In one embodiment, the object tracker 1562 can determine a cross-over dribble by checking for a change in the dribble hand for the person while the ball remains in front of the person. The object tracker 1562 can determine a between-the-legs dribble by checking for a change in the dribble hand for the person while the ball travels underneath the torso of the person (e.g., between the legs of the person) from the front of the person to the rear of the person. The object tracker 1562 can determine a behind-the-back dribble by checking for a change in the dribble hand for the person while the ball travels behind the person.

In another embodiment, the object tracker 1562 can determine one or more dribbling types based on a group of corresponding parameters that are determined by the object tracker 1562. Each dribbling type (e.g., a "back-to-front, between-the-legs dribble from right to left") can be defined as sequence or group of dribbling characteristics that can include a starting and/or ending dribble height, a dribble speed, a dribble direction, a starting and/or ending acceleration or deceleration, a spin on the ball, or a velocity of spin the ball. The object tracker 1562 can determine the particular dribbling characteristics occurring during a dribbling motion and then identify the type of dribble from the dribbling characteristics. Other techniques for detecting the types of dribbling motions can be used in other embodiments.

The object tracker 1562 can also determine other characteristics of the dribbling motion such as the ball speed, the dribble height, repetition rate (e.g., dribbles per second), dribble power or other similar characteristics by analyzing the trajectory of the ball, i.e., the change in the detected ball's position over subsequent frames of camera data and the corresponding change in time that occurred between subsequent frames. In one embodiment, the object tracker 1562 can determine the repetition rate by counting the number of times that the ball has corresponding downward (e.g., away from the dribble hand) and upward (e.g., toward the dribble hand) trajectories associated with the user's dribble hand within a predetermined time period. The object tracker 1562 can determine dribble height by using the global coordinate system to measure the distance between the starting and ending of a downward trajectory or an upward trajectory. The object tracker 1562 can determine ball speed by dividing the dribble height by the elapsed time for the ball to complete either an upward or downward trajectory. The object tracker 1562 can determine direction by defining a perpendicular axis with respect to a horizontal plane through the point where the ball changes direction and then measure the angle, relative to the defined axis, with which the ball either begins or ends an upward trajectory or a downward trajectory. The object tracker 1562 can determine dribble power based on the ball speed for a downward trajectory and the movement of the dribble hand toward the ball prior to starting the downward trajectory. The object tracker 1562 can determine a turnover has occurred when the trajectory of the ball shows that it lands in a certain area (e.g., an out-of-bounds area) or transitions directly from a hand of the person dribbling to the hand of a player on an opposing team, noting that players on the opposing team can be identified through jersey color or other identification techniques. In another embodiment, the dribbling characteristics for the dribbling motion can be determined based on information relating to the direction of gravity and information relating to the location of the athletic playing surface. In still other embodiments, still other techniques can be used to calculate the dribbling characteristics of the dribbling motion.

The object tracker 152 can correlate each measured dribbling characteristic with the player's left or right hand. Thus, statistics based on the user's left and right hand can be determined. As an example, the computing device 1504 can determine the user's dribbling speed, dribbling height, turnover ratio, or other characteristics for either his left or right hand. Thus, if desired, a player can see how his performance dribbling with his left hand compares with his performance dribbling with his right hand.

In addition, the object tracker 1562 can use the information on the passing hand(s) to determine several types of passing types (e.g., chest pass, bounce pass, overhead pass, behind-the-back pass, or baseball pass). The object tracker 1562 can review information from computer vision logic 1564 and passing hand(s) information to determine if a particular passing type has been performed. In one embodiment, the object tracker 1562 can determine a chest pass by checking for two passing hands at the torso of the person while the ball travels away from the person and does not contact the playing surface. The object tracker 1562 can determine a bounce pass by checking for two passing hands at the torso of the person while the ball travels away from the person and contacts the playing surface. The object tracker 1562 can determine an overhead pass by checking for a two-handed pass from above the head of the person while the ball travels away from the person and does not contact the playing surface. The object tracker 1562 can determine a baseball pass by checking for a single passing hand for the person at or above shoulder height while the ball travels away from the person. The object tracker 1562 can determine a behind-the-back pass by checking for a single passing hand for the person while the ball travels behind and away from the person. In another embodiment, for the baseball pass type and the behind-the-back type, the object tracker 1562 can also determine whether the pass is a bounce pass by determining if the ball contacts the playing surface while travelling away from the person.

The object tracker 1562 can also determine other characteristics of the passing motion such as the ball speed, the height of the ball when passed, the height of the ball when received, ball spin, angle and direction of departure of the ball when passed or other similar characteristics by analyzing the trajectory of the ball, i.e., the change in the detected ball's position over subsequent frames of camera data and the corresponding change in time that occurred between subsequent frames. In one embodiment, the object tracker 1562 can determine angle and direction of departure of the ball by defining both a horizontal axis and a vertical axis with respect to corresponding planes through the point where the ball exits the hand of the person passing the ball and then measure the angle relative to the vertical axis and the direction relative to the horizontal axis with which the ball begins the trajectory. In one embodiment, an origin point for both the horizontal and vertical axes can be defined and can be located at a point corresponding to the front torso of the person. The object tracker 1562 can determine pass height for either passing or receiving by using the global coordinate system to measure the distance between the starting point of the trajectory of the pass (if passing) and/or the ending point of the trajectory of the pass (if receiving) and the playing surface. The object tracker 1562 can determine ball speed by dividing the trajectory distance (i.e., the distance between the person passing the ball and the person receiving the ball) by the elapsed time for the ball to complete the trajectory. The object tracker 1562 can determine a turnover has occurred when the trajectory of the ball shows that it lands in a certain area (e.g., an out-of-bounds area) or transitions directly from the person passing the ball to a player on an opposing team, noting that players on the opposing team can be identified through jersey color or other identification techniques. In another embodiment, the passing characteristics for the passing motion can be determined based on information relating to the direction of gravity and information relating to the location of the athletic playing surface. In still other embodiments, still other techniques can be used to calculate the passing characteristics of the passing motion.

The object tracker 152 can correlate each measured shooting motion and/or passing characteristic with the player's left hand, right hand or both hands. Thus, statistics based on the user's left hand, right hand and both hands can be determined. As an example, the computing device 1504 can determine the user's passing speed, passing height, turnover ratio, or other characteristics for his left hand, right hand and/or both hands. Thus, if desired, a player can see how his performance passing with his one hand compares with his performance passing with both hands.

Once the object tracker 1562 has determined the parameters associated with characteristics from the shooting, dribbling and/or passing motion (including the dribble-to-pass transition), the object tracker 1562 can compare the determined characteristics to the preferred or "proper" characteristics (step 1608) stored in evaluation data 1582 for the training sequence. Based on the comparison between the determined characteristics and the proper characteristics, the object tracker 1562 can then calculate a score for the user (step 1610). The score for the user can be based on how quickly and/or accurately the user can reproduce the displayed training sequence or how the user's shooting characteristics, dribbling characteristics and/or passing characteristics in the game sequence compare to the proper shooting characteristics, dribbling characteristics and/or passing characteristics. The scoring of the user's performance can be based on several accuracy factors such as how closely the user replicates the correct sequence, the correct form for the shooting motion, the correct height(s) for the dribbling and/or passing motion and/or the correct ball placement or trajectory. In addition, the scoring of the user's performance in training mode can also be based on how quickly the user is able to repeat a movement from the training sequence. In contrast, in game mode, additional factors, parameters or statistics (e.g., turnover rate, amount of time with the ball, whether the user is guarded or unguarded, etc.) may be used in the scoring of a user's performance. Once the score for the user has been calculated the score can be displayed on the output device 1508 (step 1612). In one embodiment, the score can be displayed on the output device 1508 concurrent with the display of the training sequence to inform the user of how the user is performing with respect to the training sequence.

After the score is displayed to the user, a determination is then made by the computing device 1504 as to whether or not the training or game sequence has ended (step 1614). If the training sequence or game sequence has ended, the process ends. However, if the training sequence or game sequence has not ended, the process returns to step 1604 to identify further shooting, dribbling and/or passing motions from the user that can be evaluated and scored. The repetition of this process can continue until the training sequence or game sequence has ended.

Once the training sequence or game sequence has ended, the computing device 1504 may recommend one or more additional training sequences for the user based on the user's performance (e.g., score) on the completed training sequence or game sequence. More advanced training sequences may be recommended if the user performed well on the completed training sequence or game sequence. Alternatively, one or more remedial training sequences may be recommended if there were particular aspects of the completed training sequence or game sequence in which the user did not perform well.

The computing device 1504 may also provide the user with the option to review a completed training sequence or game sequence. The computing device 1504 can replay a completed training sequence or game sequence on the output device 1508 along with a video of the user's motions during the training sequence or game sequence and the concurrent score calculations based on the user's motions. The user is then able to see the portions of the training sequence or game sequence that the user may have had trouble performing.

In one embodiment, if the tracking system 1500 is used in a game situation, the object tracker 1562 can be used to obtain different types of information associated with the shooting, dribbling and/or passing motions occurring during the game. The object tracker 1562 can provide information on each player's shooting, dribbling and/or passing motion when guarded by a defender (e.g., a defender is within a predetermined distance of the person with the ball and is following the movements of the person with the ball) or when left unguarded (e.g., no defender is within the predetermined distance of the person dribbling the ball). In one embodiment, the object tracker 1562 can also provide information on when the person shooting the ball, dribbling the ball and/or performing a passing motion is being guarded by more than one defender. In another embodiment, the object tracker 1562 can also determine whether the person shooting the ball, dribbling the ball and/or performing a passing motion is being tightly guarded or being loosely guarded. The object tracker 1562 can make a determination of tight guarding if the defender is located within a first predetermined distance range of the person shooting, dribbling and/or passing the ball. If the defender is located outside of the first predetermined distance range (but within a second predetermined distance range that is greater than the first predetermined distance range) the object tracker 1562 can make a determination of loose guarding.

The object tracker 1562 can provide information on each player's shooting, dribbling and/or passing motion when guarded by a particular defender. The object tracker 1562 can use information, such as facial recognition data, shape data or pattern data, from the computer vision logic 1564 to identify the defender guarding the person shooting, dribbling and/or passing the ball. In one embodiment, the object tracker 1562 can identify a defender by initially determining whether the player has a different color or type of uniform than the person shooting, dribbling and/or passing the ball (which positive determination would make the player a defender). Once the object tracker 1562 determines that a player is a defender, the object tracker 1562 can distinguish an individual defender from the other defenders by identifying a particular characteristic associated with the defender, such as by identifying a uniform number of the defender through pattern recognition or identifying the face of the defender through facial recognition.

In addition, once the object tracker 1562 has identified a defender, the object tracker 1562 can review information from computer vision logic 1564 to determine if a particular defensive movement has been performed by the defender. In one embodiment, the object tracker 1562 can determine that a defensive movement has occurred by checking for changes in the position of the defender guarding the person dribbling and/or passing the ball relative to the movement of the ball itself. For example, the object tracker 1562 can determine if an attempt to steal the ball is occurring (or has occurred) by checking for a movement of the defender's hand toward the position of the ball at about the same time the defender's body is moving toward the person shooting, dribbling and/or passing the ball.

In another embodiment, the object tracker 1562 can determine one or more defensive movements based on a group of corresponding parameters that are determined by the object tracker 1562. Each defensive movement (e.g., a "low lunge forward to steal the ball with two hands") can be defined as sequence or group of defensive characteristics that can include hand, arm, shoulder, and leg motions of various heights, of various speeds, of various directions, of various orientations, of various accelerations or decelerations, with various rotations and/or with various velocities. The object tracker 1562 can determine the particular defensive characteristics associated with a particular defensive movement and then identify the type of defensive movement from the defensive characteristics. Other techniques for detecting defensive movements can be used in other embodiments.

The object tracker 1562 can use the information on the identified defender to correlate shooting, dribbling and/or passing motion statistics (including dribble-to-pass transition statistics) of the person shooting, dribbling and/or passing the ball to each defender guarding the person. The object tracker 1562 can provide information on the number of times the defender guarded the person, the cumulative amount of time the defender guarded the person, the shot types, dribble types and/or pass types used against the defender, the amount or percentage of time each hand (or both hands) of the person was used to shoot, dribble and/or pass the ball, the number and/or percentage of turnovers (e.g., the number of times the person shooting, dribbling and/or passing the ball loses control of the ball while being guarded by the defender), and the person's shooting, dribbling and/or passing attributes against the defender. With respect to the provided information of the dribbling attributes, the object tracker 1562 can provide information on the ball speed, dribble height, repetition rate and power of the person's dribbling motion for each defender. The provided information on the dribbling attributes can include an average value, a range of values extending from a minimum value to a maximum value and/or the value occurring for the longest time period. In another embodiment, the object tracker 1562 can provide similar information for when the person dribbling the ball is unguarded. In addition, with respect to the provided information of the passing attributes, the object tracker 1562 can provide information on the ball speed, the height of the ball when passed, the height of the ball when received, ball spin, angle and direction of departure of the ball when passed for each defender. The provided information on the passing attributes can include an average value, a range of values extending from a minimum value to a maximum value and/or the value occurring for the longest time period. In another embodiment, the object tracker 1562 can provide similar information for when the person passing the ball is unguarded.

With respect to the provided information of the shooting attributes, the object tracker 1562 can provide information on the entry angle of the shot, shot placement, rotation speed of the ball, rotation axis of the ball, release height of the shot or release speed of the shot for each defender, or any other parameter that may be indicative of of the shot. The provided information on the shooting attributes can include an average value, a range of values extending from a minimum value to a maximum value and/or the value occurring for the longest time period. In another embodiment, the object tracker 1562 can provide similar information for when the person shooting the ball is unguarded.

Various techniques can be used to track the performance of a player relative to a particular defender. As an example, by analyzing the images captured by the cameras 1504, the object tracker 1562 can identify the player and each defender using player identification techniques described in more detail above. When the player has possession of the ball as evidenced by the ball appearing in the player's hands from the images or moving along a trajectory indicative of a dribble by the player (e.g., leaving the player's hand and returning to a hand of the player after bouncing off of the floor of the dribbling area), the object tracker 1562 may analyze the images to determine the player's distance from each identified defender. The defender that is closest to the player may be identified as the defender who is guarding the player with the ball if he is within a predetermined distance of the player with the ball. If desired, the defender may be required to be within predetermined distance for at least a certain time period before a guarding determination is made in order to prevent defenders who briefly pass by the player while guarding other players from being mistakenly identified as guarding the player with the ball. Other techniques for determining whether a particular defender is guarding the player with the ball are possible in other embodiments. As an example, the body orientation of the defender may be a factor in determining whether he or she is guarding the player with the ball. In this regard, a defender facing the player with the ball for an extended time period is likely to be guarding him. The object tracker 1562 may be configured to determine that a defender is guarding the player when he is facing the player within a predefined distance of the player for at least a predefined amount of time. In another embodiment, data indicative of the defender (e.g., a jersey number of other identifier of the defender) guarding the player with the ball may be manually input to the computing device 1502 or other device of the system by a user. Yet other techniques are possible in yet other embodiments.

While an identified defender is determined to be guarding the player, the player's shooting, dribbling and/or passing characteristics can be correlated with an identifier that identifies the guarding defender. Thus, characteristics indicative of the player's shooting, dribbling and/or passing performance while being guarded by the identified defender can be determined from the data captured by the system, and the object tracker 1562 can be configured to calculate various scores and statistics indicative of such performance. Over time as the player is guarded by multiple defenders, his shooting, dribbling and/or passing performance against one defender can be compared to his shooting, dribbling and/or passing performance against another defender. Note that the information can be used to help train the person shooting, dribbling and/or passing the ball or for other purposes, such as deciding which defender would be the most effective at guarding the person shooting, dribbling and/or passing the ball.

The object tracker 1562 can determine the impact or effect that particular shooting, dribbling and/or passing characteristics or motions had on a defensive player guarding the player shooting, dribbling and/or passing the ball. For example, the object tracker 1562 can determine if a particular shooting, dribbling and/or passing characteristic was successful or unsuccessful against a defensive player or whether the person shooting, dribbling and/or passing the ball was able to perform particular shooting, dribbling and/or passing characteristics against the defensive player. A shooting, dribbling and/or passing characteristic can be considered successful if the person shooting the ball was able to launch a shot past the defensive player, if the person dribbling the ball was able to advance past the defensive player or if the person passing the ball was able to successfully provide the ball to a teammate. In contrast, a shooting, dribbling and/or passing characteristic may be considered unsuccessful if the person shooting the ball was had his/her shot blocked by the defensive player, if the person dribbling the ball was not able to advance past the defensive player, if the person passing the ball was not able to successfully provide the ball to a teammate or if the person shooting, dribbling and/or passing the ball committed a turnover (e.g., losing the ball out-of-bounds or losing the ball to the defensive player guarding the person (or another defensive player)). Other metrics for gauging the success of a shooting, dribbling and/or passing characteristic are possible in other embodiments.

Figure 5:
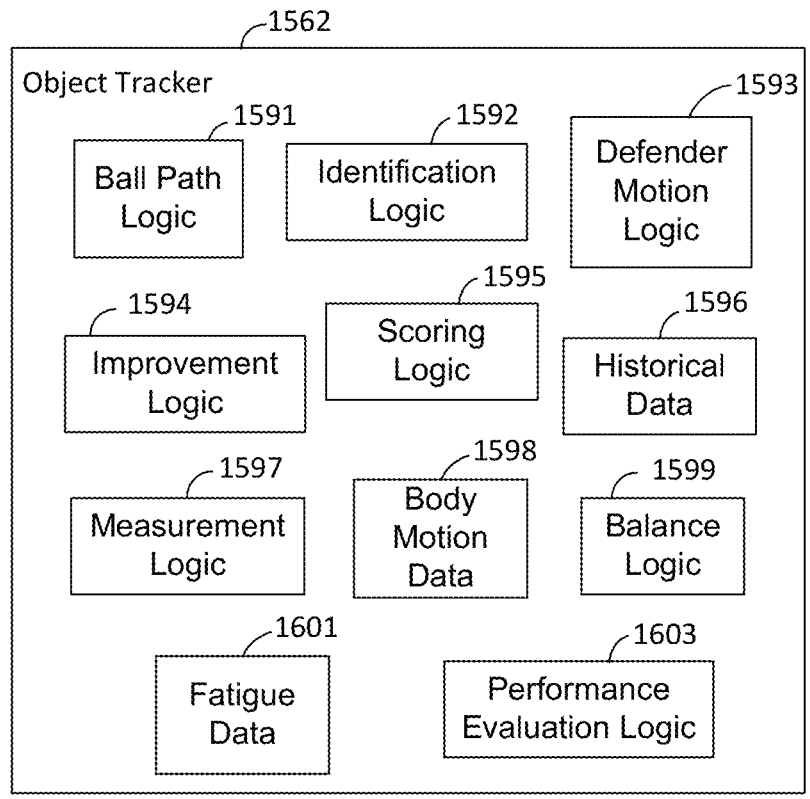
FIG. 5 is a block diagram of an embodiment of the object tracker of the computing device of FIG. 3.

FIG. 5 shows an embodiment of the object tracker 1562 that can be used by computing device 1504. The object tracker 1562 can include ball path logic 1591 for generally determining the path or movement of the ball and the person shooting, dribbling and/or passing the ball, even when the ball and/or the person are concealed from the cameras 1502, identification logic 1592 for determining the location of the ball and/or the offensive and defensive players or persons on the athletic playing surface, and scoring logic 1595 for evaluating the shooting, dribbling and/or passing motion of a person or the performance of a defender guarding the person shooting, dribbling and/or passing the ball and providing a "score" associated with the person's performance. The scoring logic 1595 can evaluate a person's performance based on information from measurement logic 1597. Measurement logic 1597 can be used to measure the capabilities of the person shooting, dribbling and/or passing the ball and/or the capabilities of the person(s) defending the person shooting, dribbling and/or passing the ball. Improvement logic 1594 can use information from measurement logic 1597 and scoring logic 1595 to determine areas where the person can improve his/her performance. The object tracker 1562 can also include defender motion logic 1593 to generally determine the movement and/or actions of a defender, even when the defender is concealed from the cameras 1502, and balance logic 1599 to evaluate the balance and/or fluidity of the person shooting dribbling and/or passing the ball and/or the person(s) defending the person shooting, dribbling and/or passing the ball. The object tracker 1562 can further include performance evaluation logic 1603 to generally determine when a person's performance has changed from the expected level of performance from that person.

Historical data 1596, fatigue data 1601 and body motion data 1598 used by the object tracker 1562 can be stored in memory 1566 at the computing device 1504. The historical data 1596 can include information relating to previous movements and actions of the person shooting, dribbling and/or passing the ball during training sequences and/or live play sequences. The historical data 1596 can also include data and information on the movements and actions of the defender(s) guarding the person shooting, dribbling and/or passing the ball. Fatigue data 1601 can include data and information on the physical state of the person shooting, dribbling and/or passing the ball. The physical state of the person can relate to how fatigued the player may be at particular times based on biometric information from the biometric sensors 1514. For example, the fatigue level of a person may be based on the heart rate and oxygen level of the person. In other embodiments, the fatigue data 1601 may be based on measured characteristics of the person's play, such as the amount of time the person has been in the game, the total distance that the person has run during the dame, the amount of time that the person has been sprinting (e.g., running at a speed over a defined threshold) during the game or time window (e.g., last fifteen minutes or some other time period), or other parameters that may affect the person's fatigue level. Body motion data 1598 can include information relating to the location and movement of a person (both the person shooting, dribbling and/or passing the ball and the defender(s)) and his/her associated body parts (e.g., head, shoulder, elbow, hand, finger, chest, waist, back, thigh, knee, calf, hip, ankle and foot) during the shooting, dribbling and/or passing of the ball or defending the person shooting, dribbling and/or passing the ball. The body motion data 1598 can also include, where applicable, left side and right side information and front and back information associated with the player's body parts.

As previously discussed, the object tracker 1562 can receive camera data 1578, sensor data 1580, information from computer vision logic 1564 and/or other information relating to the ball and the players or persons on the athletic playing surface. The ball path logic 1591 can be used to determine (or approximate) the path of the ball and the person shooting, dribbling and/or passing the ball during the shooting, dribbling and/or passing motion even if the ball or the person cannot be identified by identification logic 1592 based on the camera data 1578. For example, the identification logic 1592 (or the computer vision logic 1564) may not be able to identify the ball or the person because the ball may not be present in camera data 1578. The ball may not be present in the camera data 1578 due to the ball being concealed from the fields of view of the cameras 1502 by the person shooting, dribbling and/or passing the ball, the person(s) guarding the person shooting, dribbling and/or passing the ball and/or one or more other persons on the athletic playing surface. See e.g., FIG. 6. Further, even if the ball is present in the camera data 1578, the identification logic 1592 may not be able to recognize the ball because the ball is obscured in the camera data 1578 due to poor lighting conditions, partial occlusion of the ball and/or blurring as a result of rapid movement of the ball.

In one embodiment, the identification logic 1592 can determine if a foul or other violation occurred during the game by determining if a whistle sound occurs followed by a stoppage of play. The identification logic 1592 may also determine the occurrence of a foul or other violation, by identifying a stoppage of play followed by one or more actions of the referee (e.g., the referee moving toward the scorer's table and making one or more gestures). The identification logic 1592 can determine which player committed the foul or violation and which type of foul or violation occurred based on the hand and arm movements of the referee. For example, the referee may indicate a blocking foul by moving his/her hands onto his/her hips one or more times. The identification logic 1592 may analyze the hand gestures for identifying a foul type (e.g., interpret hand gestures for determining that a blocking foul has occurred when the referee moves his/her hands onto his/her hips within a certain time period after a whistle). The referee may also use hand gestures to indicate the number of the player who committed the foul (e.g., hold up a number of fingers indicting the number), and the identification logic 1592 may interpret such gestures to identify the player who committed the foul. The identification logic 1592 may also be able to determine which player committed the foul or violation and the type of foul or violation that occurred by processing audio information captured from the referee saying the player and type of foul or violation.

The ball path logic 1591 can use the information from the identification logic 1592 to determine the path or trajectory of the ball. When the identification logic 1592 is unable to identify the ball from the camera data 1578, the ball path logic 1591 can determine an expected trajectory or movement of the ball based on the last known location of the ball from identification logic 1592 and other information stored in memory 1566. The ball path logic 1591 can analyze the body position of the person shooting, dribbling and/or passing the ball based on the body motion data 1598 and approximate the expected trajectory of the ball and the time to complete the trajectory based on how the person shooting, dribbling and/or passing the ball is positioned. The ball path logic 1591 can confirm (or reject) the approximate trajectory of the ball once the identification logic 1592 is able to identify the ball from the camera data 1578.

For example, if a person is dribbling the ball behind his back or attempting a behind-the-back pass during a game, the ball may not be visible to identification logic 1592 due to occlusion from the person's body as well as occlusion from other players or persons on the athletic playing surface. However, identification logic 1592 may be able to detect the motion of the shoulders, arms, and hands of the person and provide that information to the ball path logic 1591. The ball path logic 1591 can then use the information from the identification logic 1592 and body motion data 1598 to approximate the motion, trajectory, direction, spin, and velocity of the ball while it is not visible or detectable to identification logic 1592 and predict the arrival time and location of the ball on the other side of the person (if dribbling) or with another person (if passing) when the ball becomes visible or detectable by the identification logic 1592 from the camera data 1578.

If the ball path logic 1591 receives information from the identification logic 1592 that the ball is in the position expected by the ball path logic 1591 (subject to a margin of error), the ball path logic 1591 can determine that the actual trajectory of the ball followed the approximated trajectory determined by the ball path logic 1591. However, if the ball path logic 1591 receives information from the identification logic 1592 that the ball is in a different location than expected, the ball path logic 1591 can determine that the movement of the ball did not follow the approximated trajectory and can approximate a new trajectory for the ball based on the starting and ending locations for the ball. In addition, the ball path logic 1591 can store information in memory 1566 (possibly as historical data 1596) on the starting and ending positions of the ball, the revised approximated trajectory and the person dribbling the ball. The ball path logic 1591 can then use the stored information on the starting and ending position for the ball and the revised approximated trajectory when formulating an approximated trajectory for the ball when the ball becomes occluded in a similar situation in the future.

In another embodiment, the ball path logic 1591 may be able to determine the trajectory or movement of the ball even if the ball or some (or all) of the person shooting, dribbling and/or passing the ball is occluded in camera data 1578. As an example, the ball may be occluded from view, but the person's elbow may be visible. Movement of the person's arm near the elbow may indicate when the ball has reached or exited the person's hand. In this regard, a change in movement of the person's arm may indicate that the ball has reached the person's hand and is being pushed downward for a dribble or outward for a pass. Further, the ball path logic 1591 may calculate the location of the ball at the time it is determined to reach or exit the person's hand based on the location and orientation of the person's elbow. In this regard, the arm length of the person may be predetermined and used by the logic 1591 to determine the ball's distance from the person's elbow. Also, the angle of the person's forearm may indicate the ball's direction from his elbow. By determining various locations of the ball at different times while the ball is occluded, the ball path logic 1591 can estimate the trajectory of the ball between such points.

If desired, the ball path logic 1591 can use computer learning and/or artificial intelligence to establish the most likely paths the ball would travel based on any other current data that is available (e.g., data extracted from camera data 1578 or data from sensor data 1580 such as depth sensor, motion sensor/accelerometer or sound information) or from historical data 1596 that includes information of what the person is most likely to do in a particular situation or environment. In this regard, by analyzing the person's movements over time, the ball path logic 1591 can learn how the person likely responds to certain conditions (such as the fatigue level of the person, when the person is double teamed, when the person drives toward the lane, when a defender attempts to steal the ball, etc.) and then predict the ball movements and trajectories based on such learned tendencies when the ball is occluded from view during similar conditions.

The ball path logic 1591 can analyze the current data and make a determination regarding the expected movement of the ball based on the current conditions associated with the person shooting, dribbling and/or passing the ball. For example, if the person shooting, dribbling and/or passing the ball is being trapped by two defenders (the two defender scenario), the ball path logic 1591 can determine that it will be unlikely for the person shooting, dribbling and/or passing the ball to attempt a shot, use a behind-the-back dribble (or other dribble type) or a behind-the-back pass (or other pass type) in the direction of one of the defenders and determine the available directions that the ball could be shot, dribbled and/or passed to approximate a likely movement of the ball. The ball path logic 1591 can then evaluated the approximated movement of the ball as described above.

If the ball path logic 1591 is not able to approximate the movement of the ball from the currently available data, the ball path logic 1591 may able to approximate the movement of the ball based on historical data 1596 associated with the person shooting, dribbling and/or passing the ball. In other words, the ball path logic 1591 can determine an approximate movement of the ball based on the previous movements of the person in similar situations. For example, in the two defender scenario, the ball path logic 1591 may determine based on historical data 1596 that the person shooting, dribbling and/or passing the ball usually attempts to shoot, dribble or pass between the defenders when confronted by two defenders. Using that determination, the ball path logic 1591 can approximate a trajectory or movement of the ball that has the ball travelling between the defenders. The ball path logic 1591 can then evaluate the approximated movement of the ball as described above.

In one embodiment, the ball path logic 1591 can determine the current position and situation of the person dribbling and/or passing the ball and determine the possible moves that can be made from that position and situation. The ball path logic 1591 can then determine the probabilities of the person shooting, dribbling and/or passing the ball executing each of the possible moves and use the probability determinations in determining the approximate movement of the ball. For example, in the two defender scenario, there are multiple moves or sequences possible for the person dribbling the ball such as: pick up the ball; cross-over dribble from left to right; cross-over dribble from right to left; front to back between-the-legs dribble from left to right; front to back between-the-legs dribble from right to left; back to front between-the-legs dribble from right to left; back to front between-the-legs dribble from left to right; behind-the-back dribble from left to right; and behind-the-back dribble from right to left. In another example using the two defender scenario, there are multiple moves or sequences possible for the person passing the ball (possibly after completing a dribbling motion) such as: bounce pass between the defenders; bounce pass to the left of the defenders; bounce pass to the right of the defenders; chest pass between the defenders; chest pass to the right of the defenders; chest pass to the left of the defenders; overhead pass over the defenders; baseball pass over the defenders; behind-the-back pass to the left; and behind-the-back pass to the right. However, the person shooting, dribbling and/or passing the ball, based on their historical data 1596, may only be capable of doing a few of the possible shooting, dribbling and/or passing sequences and may not have the requisite skill level and/or may not have used the other possible shooting, dribbling and/or passing sequences in the past. The ball path logic 1591 can assign a higher probability to the shooting, dribbling and/or passing sequences previously performed by the person and a lower probability to the other shooting, dribbling and/or passing sequences. In contrast, a more skilled player may be able to perform most or all of the possible shooting, dribbling and/or passing sequences and the ball control logic 1591 would assign different probabilities to the possible sequences. The ball path logic 1591 can then use the assigned probabilities to determine an approximate movement for the ball. The ball path logic 1591 can then evaluate the approximated movement of the ball for accuracy as described above.

In one embodiment, the ball path logic 1591 can process video/audio/depth sensing/motion sensing sequences that include tagged descriptors provided by a reviewer of the camera data 1578 which describe dribble patterns, dribbler patterns, levels of dribbling capability, transition patterns, pass types, passer patterns and/or levels of passing capability in a quantitative or qualitative way. The ball path logic 1591 can use the tagged descriptors in building a knowledge base for machine learning and/or artificial intelligence. The degree of tagging provided in the video/audio/depth sensing/motion sensing data can vary between no tagging, light tagging, or full tagging. As the knowledge base for the ball path logic 1591 increases, the machine learning and/or artificial intelligence of the ball path logic 1591 can be used to "track" the movements of the ball and the person shooting, dribbling and/or passing the ball for longer periods when the ball and the person are mostly occluded from the view of cameras 1502 or sensors 1514.

In another embodiment, the ball path logic 1591 may be able to use data from only a single sensor (e.g., a camera 1502, audio detector, depth sensor or motion sensor) to accomplish ball movement determinations across an entire athletic playing surface even though the ball and/or aspects of the person shooting, dribbling and/or passing the ball are occluded much of the time. The ball path logic 1591 can use one or more of the techniques described above to determine the movement of the ball with only an occasional detection of the ball by identification logic 1592 to locate/relocate the ball between analysis techniques.

In still another embodiment, the ball path logic 1591 can use machine learning and/or artificial intelligence to analyze the historical data 1596 to uncover patterns and trend information. The ball path logic 1591 can then use the pattern and trend information when determining the probabilities associated with the location and movement of the ball.

The defender motion logic 1593 can be used to identify the specific person guarding the person shooting, dribbling and/or passing the ball and determine or approximate the movements and actions of the identified defender. The defender motion logic 1593 can determine the movements and actions of one or more defenders (once identified) guarding a person shooting, dribbling and/or passing the ball even if the defender(s) cannot be continuously identified by identification logic 1592 from the camera data 1578. For example, the identification logic 1592 (or the computer vision logic 1564) may not be able to identify a defender because the defender may not be present in camera data 1578. The defender may not be present in some portions of the camera data 1578 due to the defender being concealed from the field of view of the cameras 1502 by the person dribbling the ball and/or one or more other persons on the athletic playing surface. Further, even if the defender is present in the camera data 1578, the identification logic 1592 may not be able to identify the defender because the defender is obscured in the camera data 1578 due to poor lighting conditions and/or partial occlusion of the defender (particularly those features used to identify the defender).

Prior to determining the movements of a defender, the defender motion logic 1593 may determine whether a defensive player is defending the person shooting, dribbling and/or passing the ball. The defender motion logic 1593 can determine whether a defensive player or players is guarding the person shooting, dribbling and/or passing the ball based on the distance between the defensive player and the person shooting, dribbling and/or passing the ball and the position and/or orientation of the defensive player with respect to the person shooting, dribbling and/or passing the ball. For example, a defensive player within 5 feet of the person shooting, dribbling and/or passing the ball and facing the person shooting, dribbling and/or passing the ball can be considered to be guarding the person shooting, dribbling and/or passing the ball. Once the defender motion logic 1593 has determined a defensive player is a defender of the person shooting, dribbling and/or passing the ball, the defender motion logic 1593 can identify the specific defender using information from the identification logic 1592 regarding the identity of the player. The defender motion logic 1593 can use identification information directly from the identification logic 1592 or the computer vision logic 1564 to specifically identify the defender. In another embodiment, the defender motion logic 1593 can perform the identification of the specific defender based on the information from the identification logic 1592. For example, the defender motion logic may use body motion data 1598 to identify the specific defender since each player can have a unique body motion profile. The defender motion logic 1593 can then designate and store specific movements and actions of the specific defender in responding to actions of the person shooting, dribbling and/or passing the ball. The measurement logic 1597 can use the stored information by the defender motion logic in evaluating the performance of the defender.

In one embodiment, the defender motion logic 1593 can identify the location in a 3-D space of the defender's fingers, hands, elbows, shoulders, chest, head, waist, back, thighs, knees, calves, hips, ankles, feet, and/or other body parts. In addition, once the individual body parts have been identified, the defender motion logic 1593 can determine relative locations of the identified body parts to each other. The defender motion logic 1593 can provide the information of the defender's body to the body motion data 1598 for use by the object tracker 1562. For example, the balance logic 1599 can use the body motion data 1598 to measure or infer the balance of the defender and the defender's ability to respond. In one embodiment, the defender's balance could be relative to the balance of a normal person from a chosen group or could be relative to the "normal" balance of the particular defender using historical data 1596. In another embodiment, since the players on the athletic playing surface alternate between offense and defense, the defender motion logic 1593 can specifically identify each of the players and store corresponding information for each of the players.

The defender motion logic 1593 can use the information from the identification logic 1592 to determine the movement and/or actions of the defender. In addition, the defender motion logic 1593 can assign parameters to the defender movements and/or actions and categorize the outcome of the particular defensive movements and/or actions. Some examples of categories that can be used are: the defender committed a foul, which can include information on the foul type and other parameters associated with the foul; the defender stole the ball from the person shooting, dribbling and/or passing the ball (a steal), which can include information on the action that resulted in the steal and other parameters associated with the steal; the defender maintained defensive position (e.g., the defender is facing the person shooting, dribbling and/or passing the ball and is located at a position between the person and the basketball goal) on the person shooting, dribbling and/or passing the ball; the defender did not maintain defensive position on the person shooting, dribbling and/or passing the ball; or other activity outcome descriptors.

When the identification logic 1592 cannot provide specific information on the location of the defender, possibly due to occlusion or lighting, the defender motion logic 1593 can determine an expected movement of the defender based on the last known location of the defender from identification logic 1592 and other information stored in memory 1566. The defender motion logic 1593 can use computer learning to establish the most likely movements and/or actions the defender would perform based on any other current data that is available (e.g., data extracted from camera data 1578 or data from sensor data 1580 such as depth sensor, motion sensor/accelerometer or sound information) or from historical data 1596 that includes information on what the person is most likely to do in a particular situation or environment.

The defender motion logic 1593 can analyze the current data and make a determination regarding the expected movement and/or actions of the defender based on the current conditions associated with the defender. For example, if the defender is guarding a person dribbling to the defender's right and the defender has been previously moving to the right, the defender motion logic 1593 can determine that the defender may continue to move to the right and that it is unlikely for the defender to slide to the left. Thus, the defender motion logic 1593 can use computer learning and/or artificial intelligence to determine the possible directions the defender could move, look at the outcome of the defensive sequence based on the location of the defender from identification logic 1592 and determine which defensive movement was actually used.

If the defender motion logic 1593 is not able to approximate accurately the movement and/or actions of the defender from the currently available data, the defender motion logic 1593 may be able to approximate the movement and/or actions of the defender based on historical data 1596 associated with the defender. In other words, the defender motion logic 1593 can determine an approximate movement and/or action for the defender based on the previous movements of the person in similar situations. For example, when the person dribbling the ball is moving to the defender's left, the defender motion logic 1593 may determine based on historical data 1596 that the defender will likely take a step back and then move to the left. Using that determination, the defender motion logic 1593 can approximate the movement and/or actions of the defender as backwards and then to the left. The defender motion logic 1593 can then evaluate the approximated movement of the defender once information on the defender becomes available from the identification logic 1592.

In one embodiment, the defender motion logic 1593 can determine the current position and situation of the defender relative to the person shooting, dribbling and/or passing the ball and determine the possible moves and/or actions that can be made from that position and situation. The defender motion logic 1593 can then determine the probabilities of the defender executing each of the possible moves and/or actions and use the probability determinations in predicting or otherwise estimating the approximate moves or actions of the defender. For example, if the defender is guarding a person making a cross-over dribble from right to left (as seen by the defender), there are a number of motions and/or actions the defender could make such as: a low lunge forward to steal the ball with two hands; a low lunge forward with the right hand to tip the ball up; a low lunge forward with the right hand to tip the ball sideways; a slide to the left maintaining distance with the person dribbling the ball; a step back to allow more space and prevent the person dribbling the ball from advancing to the hoop; a jump forward to block the vision of the person and prevent a pass or shot; a jump left or right or up to prevent a pass by the person; or a "broken ankles" stumble because the dribble move was so effective that the defender lost their defensive position and/or balance. However, the defender, based on their historical data 1596, may only be capable of doing a few of the possible movements or actions and may not have the requisite skill level and/or may not have used the other possible movements or actions in the past. The defender motion logic 1593 can assign a higher probability to the movements and/or actions previously performed by the person and a lower probability to the other movements and/or actions. In contrast, a more skilled player may be able to perform most or all of the possible movements and/or actions and the defender motion logic 1593 would assign different probabilities to the possible sequences. The defender motion logic 1593 can then use the assigned probabilities to predict an approximate movement and/or action for the defender. The defender motion logic 1593 can then evaluate the approximated movement of the defender once information on the defender becomes available from the identification logic 1592 to determine whether the prediction is accurate.

In one embodiment, the defender motion logic 1593 can process various sequences (e.g., video sequences, audio sequences, depth sensor sequences or motion sensor sequences) about a defender that includes tags (or tagged descriptors) with information about defender patterns and/or defender capabilities in a quantitative or qualitative way. The tags provide information and/or a description about the content (e.g., the actions of the defender) of a sequence and can be associated with the sequence (or file) similar to metadata. A sequence can have a single tag describing the actions of the defender or multiple tags describing different actions of the defender. The tags can correspond to actions or categories of actions (e.g., a steal or block) which are recognized by the defender motion logic 1593. A user can review the sequences (which may be obtained from camera data 1578) and apply the appropriate tag(s) to the defender's actions in the sequence. When applying a tag, the user can select from a predetermined list of tags and/or can create their own tag. The degree of tagging provided in the sequence data can vary between no tagging, light tagging, or heavy tagging. The defender motion logic 1593 can use the tagged descriptors in building a knowledge base for machine learning and/or artificial intelligence. As the knowledge base for the defender motion logic 1593 increases, the machine learning and/or artificial intelligence of the defender motion logic 1593 can be used to "track" the movements of the defenders for longer periods when the defenders are mostly occluded from the view of cameras 1502 or sensors 1514.

In another embodiment, the defender motion logic 1593 may be able to use data from only a single sensor (e.g., a camera 1502, audio detector, depth sensor or motion sensor) to accomplish defender movement and/or action determinations across an entire athletic playing surface even though the defender may be occluded much of the time. The defender motion logic 1593 can use one or more of the techniques described above to determine the movements of the defender with only an occasional detection of the defender by identification logic 1592 to assess/reassess the position of the defender between analysis techniques.

The measurement logic 1597 can be used to analyze data about the person shooting, dribbling and/or passing the ball and the defender of the person shooting, dribbling and/or passing the ball. The measurement logic can use information from identification logic 1592, ball path logic 1591, defender motion logic 1593, balance logic 1599, historical data 1596, body motion data 1598 and/or evaluation data 1582 to analyze the performance and capabilities of the person shooting, dribbling and/or passing the ball and the defender(s) of the person shooting, dribbling and/or passing the ball.

The measurement logic 1597 can determine the proficiency of the person dribbling the ball with respect to many different dribbling characteristics. For example, some of the dribbling characteristics of the person dribbling the ball that can be evaluated by the measurement logic 1597 can include the person dribbling the ball performing very low dribbling, very fast dribbling, fast changes in dribbling speed (i.e., acceleration or deceleration), fast changes in dribbling direction, multiple fast changes in dribbling direction, stopping a forward or sideways motion very quickly while maintaining a dribble, fast transitions from dribbling to shot release, fast transitions from dribbling to pass (for a wide variety of passing types and situations), and/or any other desired dribbling characteristic. Each of these dribbling characteristics can be described by one or more quantitative parameters. For example, very low dribbling can be characterized by maintaining the dribble height (actual or average) under a predefined value, very fast dribbling can be characterized by the person maintaining the dribbles per second above a predefined value, fast changes in dribbling speed can be characterized by completing a change in the dribbles per second within a predefined time period, fast changes in dribbling direction can be characterized by completing a change of direction within a predefined time period, multiple fast changes in dribbling direction can be characterized by completing several changes of direction within a predefined time period, stopping a forward or sideways motion very quickly while maintaining the dribble can be characterized by ending an active motion (while maintaining a dribbling motion) within a predefined time period and/or predefined distance, fast transitions from dribbling to shot release can be characterized by the time to transition from a dribbling motion to a shooting motion being within a predefined time period, and fast transitions from dribbling to pass can be characterized by the time to transition from a dribbling motion to a passing motion being within a predefined time period. Each of the dribbling characteristics can further be characterized by some type of qualitative or quantitative score from scoring logic 1595 that indicates the level of skill required to achieve proficiency over the dribbling characteristic. In one embodiment, the measurement logic 1597 can provide the person's dribbling characteristics relative to individual defensive players.

The measurement logic 1597 can also determine the proficiency of the person dribbling the ball with respect to the person's ability to achieve the same pattern of dribbling every time. The measurement logic 1597 can evaluate a person's ability to complete training sequences that can require specified dribble speeds, specified dribble heights, specified changes in speed, specified changes in dribble position, specified changes in head/shoulder/elbow/hand/finger/chest/waste/thigh/knee/ankle/foot position and/or specified maintenance of balance. The measurement logic 1597 can also determine the proficiency of the person dribbling the ball by evaluating whether the person is able to repeat the same dribble move in a highly effective way in game situations. Each of these situations can be described by a quantitative parameter or set of parameters. For example, to evaluate the person's proficiency in completing a training sequence, the measurement logic 1597 may individually evaluate the person's completion of each of the individual tasks (which can correspond to one or more parameters) in the training sequence. Each of these parameters can further be characterized by some type of qualitative or quantitative score from scoring logic 1595 that indicates the level of skill required to achieve proficiency over the dribbling moves.

The measurement logic 1597 can evaluate the performance of the person dribbling the ball based on the number and type of different movements that are performed by the person dribbling the ball in response to the same or similar situation. In other words, the measurement logic 1597 can determine the person's proficiency in not repeating the same pattern of dribbling every time. The ability of the person dribbling the ball to vary the dribbling motions used in response to particular situations can be used to limit the effectiveness of the defensive player in identifying and responding to repetitive patterns in the person's dribbling motion. The measure of the person's ability not to repeat the same pattern of dribbling can be described by one or more quantitative parameters. Each of these parameters can further be characterized by some type of qualitative or quantitative score from scoring logic 1595 that indicates the level of skill required to achieve that non-repetitive capability.

The measurement logic 1597 can determine the proficiency of the person passing the ball with respect to many different passing characteristics. For example, some of the passing characteristics of the person passing the ball that can be evaluated by the measurement logic 1597 can include passing the ball very quickly, providing the ball at predetermined location relative to the person receiving the ball, fast transitions from dribbling to pass, and/or any other desired passing characteristic. Each of these passing characteristics can be described by one or more quantitative parameters. For example, passing the ball very quickly can be characterized by passing the ball at a speed greater than a predefined value, providing the ball at predetermined location relative to the person receiving the ball can be characterized by the ball being provided within a predefined distance of a locus on the person receiving the pass (e.g., the center of the chest), and fast transitions from dribbling to pass can be characterized by the time to transition from a dribbling motion to a passing motion being within a predefined time period. Each of the passing characteristics can further be characterized by some type of qualitative or quantitative score from scoring logic 1595 that indicates the level of skill required to achieve proficiency over the passing characteristic. In one embodiment, the measurement logic 1597 can provide the person's passing characteristics relative to individual defensive players.

The measurement logic 1597 can also determine the proficiency of the person passing the ball with respect to the person's ability to achieve the same pattern of passing every time. The measurement logic 1597 can evaluate a person's ability to complete training sequences that can require specified transitions from dribbling types, specified passing speeds, specified locations for the pass, specified changes in head, shoulder, elbow, hand, finger, chest, waste, thigh, knee, ankle, and/or foot position and/or specified maintenance of balance. The measurement logic 1597 can also determine the proficiency of the person passing the ball by evaluating whether the person is able to repeat the same passing motions in a highly effective way in game situations. Each of these situations can be described by a quantitative parameter or set of parameters. For example, to evaluate the person's proficiency in completing a training sequence, the measurement logic 1597 may individually evaluate the person's completion of each of the individual tasks (which can correspond to one or more parameters) in the training sequence. Each of these parameters can further be characterized by some type of qualitative or quantitative score from scoring logic 1595 that indicates the level of skill required to achieve proficiency over the passing motions.

The measurement logic 1597 can evaluate the performance of the person passing the ball based on the number and type of different movements that are performed by the person passing the ball in response to the same or similar situation. In other words, the measurement logic 1597 can determine the person's proficiency in not repeating the same pattern of passing every time. The ability of the person passing the ball to vary the passing motions used in response to particular situations can be used to limit the effectiveness of the defensive player in identifying and responding to repetitive patterns in the person's passing motion. For example, the ability of the person to execute different types of passes (e.g., bounce pass, chest pass, etc.) after completing different dribbling moves (e.g., behind-the-back dribble, crossover dribble, between-the-legs dribble, etc.) can limit the effectiveness of the defensive player. The measure of the person's ability not to repeat the same pattern of passing can be described by one or more quantitative parameters. Each of these parameters can further be characterized by some type of qualitative or quantitative score from scoring logic 1595 that indicates the level of skill required to achieve that non-repetitive capability.

The measurement logic 1597 can determine the proficiency of the person shooting the ball with respect to many different shooting parameters associated with shooting characteristics. For example, some of the shooting parameters of the person shooting the ball that can be evaluated by the measurement logic 1597 can include parameters associated with the shot type, the entry angle of the shot, shot placement (e.g., depth of the shot and left-right position of the shot), rotation speed of the ball, rotation axis of the ball, release height of the shot or release speed of the shot and/or any other desired parameter associated with a shooting characteristic. Each of these shooting parameters can be described by one or more quantitative parameters. For example, the entry angle of the shot can be characterized by whether the entry angle is greater than or less than a predefined value or otherwise within a predefined range, the shot placement can be characterized by the ball being shot within a predefined distance(s) of a locus associated with the hoop, and rotation speed of the ball can be characterized by shooting the ball at a speed greater than or less than a predefined value or otherwise within a predefined range. Each of the shooting characteristics can further be characterized by some type of qualitative or quantitative score from scoring logic 1595 that indicates the level of skill required to achieve proficiency over the shooting characteristic. In one embodiment, the measurement logic 1597 can provide the person's shooting characteristics relative to individual defensive players.

The measurement logic 1597 can determine the proficiency of the person in transitioning from dribbling the ball to passing the ball with respect to many different characteristics. For example, the measurement logic 1597 can evaluate one or more dribbling characteristics (as described above) of the person during a time period associated with the end of the dribbling motion and one or more passing characteristics (as described above) of the person during the start (and possibly the completion) of the passing motion. In addition, the measurement logic 1597 can also evaluate the transition characteristics of the person in transitioning from the dribbling motion to the passing motion. Each of these dribbling, passing and/or transition characteristics can be described by one or more quantitative parameters. For example, fast transitions from dribbling to pass can be characterized by the time to transition from a dribbling motion to a passing motion being within a predefined time period. Each of the dribbling, passing and/or transition characteristics can further be characterized by some type of qualitative or quantitative score from scoring logic 1595 that indicates the level of skill required to achieve proficiency over the corresponding characteristic.

The measurement logic 1597 can also determine the proficiency of the person in transitioning from dribbling the ball to passing the ball with respect to the person's ability to achieve the same pattern of transition every time. The measurement logic 1597 can evaluate a person's ability to complete training sequences that can require specified transitions from dribbling types, specified transitions to passing types, specified changes in head, shoulder, elbow, hand, finger, chest, waste, thigh, knee, ankle, and/or foot position and/or specified maintenance of balance. The measurement logic 1597 can also determine the proficiency of the person in transitioning from dribbling the ball to passing the ball by evaluating whether the person is able to repeat the same dribbling and passing motions in a highly effective way in game situations. Each of these situations can be described by a quantitative parameter or set of parameters. For example, to evaluate the person's proficiency in completing a training sequence, the measurement logic 1597 may individually evaluate the person's completion of each of the individual tasks (which can correspond to one or more parameters) in the training sequence. Each of these parameters can further be characterized by some type of qualitative or quantitative score from scoring logic 1595 that indicates the level of skill required to achieve proficiency over the transitions from dribbling motions to passing motions.

The measurement logic 1597 can evaluate the performance of the person in transitioning from dribbling the ball to passing the ball based on the number and type of different movements that are performed by the person in ending the dribbling motion and beginning the passing motion in response to the same or similar situation. In other words, the measurement logic 1597 can determine the person's proficiency in not repeating the same pattern of transitioning from dribbling the ball to passing the ball every time. The ability of the person transitioning from dribbling the ball to passing the ball to vary the dribbling motions and passing motions used in response to particular situations can be used to limit the effectiveness of the defensive player in identifying and responding to repetitive patterns of the person. For example, the ability of the person to execute different types of passes (e.g., bounce pass, chest pass, etc.) after completing different dribbling moves (e.g., behind-the-back dribble, crossover dribble, between-the-legs dribble, etc.) can limit the effectiveness of the defensive player. The measure of the person's ability not to repeat the same pattern of transitioning from dribbling to passing can be described by one or more quantitative parameters. Each of these parameters can further be characterized by some type of qualitative or quantitative score from scoring logic 1595 that indicates the level of skill required to achieve that non-repetitive capability. In one embodiment, measurement logic 1597 can use machine learning and/or artificial intelligence to measure and/or evaluate, directly or indirectly, a player's performance in shooting the ball, dribbling the ball, and/or passing the ball.

In one embodiment, the measurement logic 1597 can determine the number of assists by the person dribbling and/or passing the ball. An assist can be defined as the last pass to a person that directly leads to the scoring of a basket. In addition, for an assist, the person receiving the pass must move directly toward the basket in a "scoring motion," which may include dribbling the ball. The measurement logic 1597 can be used to determine when the person dribbling and/or passing the ball makes a pass to a teammate and when the teammate receiving the pass takes (and makes) a shot at the basket (i.e., scores a field goal). The measurement logic 1597 can track the motions and actions of the teammate receiving the pass and determine if the teammate receiving the pass has performed a "scoring motion." The measurement logic 1597 can determine a scoring motion based on the movements and actions of the teammate involved with the scoring of a basket and numerous other factors such as the amount of time between receiving the pass and scoring the basket, the movement of the teammate towards the basket and the location where the shot was taken relative to the location where the pass was caught. The measurement logic 1597 can also track the passer's number of assists for each of his/her teammates. In another embodiment, the measurement logic 1597 can determine whether the person dribbling the ball has taken (and made) a shot at the basket.

The measurement logic 1597 can also evaluate the effectiveness of the person dribbling the ball with respect to the defender(s) guarding the person. The measurement logic 1597 can use information from balance logic 1599 to determine changes in the body orientation and position and balance of the defender as a result of a dribbling move. For example, a person dribbling the ball may cause a defender to stumble and/or fall after performing a particular dribbling move (e.g., a cross-over dribble) which enables the person dribbling the ball to "defeat" the defender and progress to the basket or an open position on the court. The measure of the ability of the person dribbling the ball to negatively impact a defender's balance and position and orientation to enable the person dribbling the ball to advance to the basket can be described by one or more quantitative parameters. Each of these parameters can further be characterized by some type of qualitative or quantitative score from scoring logic 1595 that indicates the level of ability in disrupting the defender's body orientation and position and balance.

The measurement logic 1597 can also determine the ability of the person shooting, dribbling and/or passing the ball to complete one or more related objectives such as a high number of assists and/or a low number of turnovers. The objectives can be calculated based on the person's overall performance or with respect to individual defensive players. The measure of a player's ability to achieve the related objectives and to determine how much of the achievement of the higher-order objectives is due to shooting, dribbling and/or passing expertise can be described by a quantitative parameter or set of parameters. For example, the measurement logic 1597 can determine the effectiveness of a dribbling move in generating an open passing lane (that can result in a score by the person receiving the ball) for the person dribbling the ball when evaluating the passing performance for the player and/or the number of assists. Each of these parameters can further be characterized by some type of qualitative or quantitative score from scoring logic 1595 that indicates the level of skill required to achieve the higher order objectives.

The measurement logic 1597 can determine the proficiency of the defender with respect to many different defensive characteristics. For example, some of the defensive characteristics of the defender that can be evaluated by the measurement logic 1597 can include the defender having a very fast forward speed, very fast forward acceleration, very fast forward lunge acceleration, very low forward lunge, very fast side defensive speed, very fast side defensive acceleration, very low side defensive position, very fast change of direction of side movement, very fast ending of side movement, very fast reverse speed, very fast transition from dribbling defensive position to pass interception position, very fast transition from dribbling defensive position to shot defensive position, and/or any other desired defensive characteristic. Each of these defensive characteristics can be described by one or more quantitative parameters. For example, very fast forward speed can be characterized by maintaining a forward speed (actual or average) above a predefined value, very fast forward acceleration can be characterized by having an acceleration rate above a predefined value, very fast forward lunge acceleration can be characterized by having a lunge acceleration rate above a predefined value, very low forward lunge can be characterized by maintaining the defender's forward lunge position below a predefined height, very fast side defensive speed can be characterized by maintaining a lateral speed (e.g., a speed in moving to the side) above a predefined value, very fast side defensive acceleration can be characterized by having a side acceleration rate above a predefined value, very low side defensive position can be characterized by maintaining a side defensive position below a predefined height, very fast change of direction of side movement can be characterized by switching from one side movement to an opposed sided movement within a predefined time period, very fast ending of side movement can be characterized by stopping a side movement within a predefined time or predefined distance, very fast reverse speed can be characterized by maintaining a reverse speed (actual or average) above a predefined value, very fast transition from dribbling defensive position to pass interception position can be characterized by the time to transition from a dribbling defensive position to a passing defensive position being within a predefined time period, very fast transition from dribbling defensive position to shot defensive position can be characterized by the time to transition from a dribbling defensive position to a shot defensive position being within a predefined time period. Each of the defensive characteristics can further be characterized by some type of qualitative or quantitative score from scoring logic 1595 that indicates the level of skill required to achieve proficiency over the defensive characteristic. In one embodiment, the measurement logic 1597 can provide the defender's defensive characteristics relative to individual offensive players (e.g., a specific person dribbling the ball).

The measurement logic 1597 can also determine the proficiency of the defender with respect to the defender's ability to achieve one or more patterns of defensive movements. The measurement logic 1597 can evaluate a defender's ability to complete training sequences that can require specified forward speeds, specified defensive heights, specified changes in speed, specified changes in defensive position, specified changes in body position and/or specified maintenance of balance. The measurement logic 1597 can also determine the proficiency of the defender by evaluating whether the person is able to repeat the same defensive movements or actions in a highly effective way in game situations. Each of these situations can be described by a quantitative parameter or set of parameters. For example, to evaluate the defender's proficiency in completing a training sequence, the measurement logic 1597 may individually evaluate the defender's completion of each of the individual tasks (which can correspond to one or more parameters) in the training sequence. Each of these parameters can further be characterized by some type of qualitative or quantitative score from scoring logic 1595 that indicates the level of skill required to achieve proficiency over the defensive movements and/or actions.

The measurement logic 1597 can evaluate the performance of the defender based on the number and type of different movements that are performed by the defender in response to the same or similar situation. In other words, the measurement logic 1597 can determine the defender's proficiency in not repeating the same defensive movements and/or actions for a given situation. The ability of the defender to vary the defensive movements and/or actions used in response to particular situations can be used to limit the effectiveness of the person dribbling the ball in identifying and responding to repetitive patterns in the defender's defensive movements. The measure of the person's ability not to repeat the same pattern of defensive movements can be described by one or more quantitative parameters. Each of these parameters can further be characterized by some type of qualitative or quantitative score from scoring logic 1595 that indicates the level of skill required to achieve that non-repetitive capability.

The measurement logic 1597 can also determine the ability of the defender to complete one or more related objectives such as a such as a high number of steals, high number of blocks, high number of deflected passes, high number of deflected shots, and/or high number of traps. The objectives can be calculated based on the defender's overall performance or with respect to individual offensive players. The measure of a defender's ability to achieve the related objectives and to determine how much of the achievement of the related objectives is due to defensive expertise can be described by a quantitative parameter or set of parameters. For example, the measurement data 1597 can determine the effectiveness of a defensive move in positioning the defender to either deflect a pass from the person dribbling the ball or steal the pass from the person dribbling the ball. Each of these parameters can further be characterized by a qualitative or quantitative score from scoring logic 1595 that indicates the level of skill required to achieve the related objectives.

In one embodiment, the measurement logic 1597 can determine the use of a "screen" on the defender of the person dribbling the ball and the defender's response to the screen. A screen is a known basketball term that generally refers to a play or situation when an offensive player, referred to hereafter as "offensive screener," without the ball establishes a stationary position to block the path of the defender of another offensive player, referred to hereafter as the "offensive screen target," moving towards the screener who is setting the screen. The offensive screen target can either have the ball or can be attempting to receive a pass from the person with the ball. The measurement logic 1597 can detect the occurrence of a screen by determining the establishment of a stationary position by the offensive screener near the defender of the offensive screen target such that the path of the defender intersects with the stationary position of the offensive screener.

Note that there are various factors that can be used in the determination of whether a screen has occurred. As an example, the probability of a screen may be increased if the defender contacts the offensive screener within a predefined time after establishment of the screener's stationary position. In addition, the orientation of the offensive screener to the defender of the offensive screen target may be indicative of whether a screen has occurred. In this regard, an offensive screener often faces the defender when setting a screen so as to help increase the width of the screen and, thus, the screen's effectiveness of disrupting the path of the defender. In addition, the proximity of the offensive screen target relative to the offensive screener may indicate whether a screen is occurring. In this regard, an offensive screen target often passes within a close proximity or even contacts the offensive screener when passing the offensive screener. Thus, detecting that the offensive screen target has passed the offensive screener within a predefined distance may indicate the occurrence of a screen. The measurement logic 1597 may detect any of the events described above as indicative of a screen and may detect the occurrence of a screen based on any combination of such factors. As an example, in assessing whether a stationary position of the offensive screener constitutes a screen, the measurement logic 1597 may calculate a screen score that is increased by a certain amount for each detection of an event that indicates the occurrence of the screen while the offensive screener is in the stationary position. If the screen score exceeds a predefined threshold, then the measurement logic 1597 may detect the occurrence of a screen. In other embodiments, other techniques for detecting an occurrence of a screen are possible.

When a screen is detected, the measurement logic 1597 may assess how various players performed during the screen and track the results over time to determine a score, referred to herein as "screen score," indicating each player's skill level in executing screens or defending against screens. As an example, the measurement logic 1597 can determine how the defensive player responded to the screen. The measurement logic 1597 can determine if the defensive player goes "above" or "below" the screen, stops motion or switches defensive assignment with another defensive player such that the defensive player is no longer guarding the person dribbling the ball.

In this regard, as is commonly understood in basketball, it is generally desired for a defensive player to defend against a screen by going "above" the screen. Going "above" the screen generally refers to when the defender passes the offensive screener on the same side as the offensive screen target. This is often the more challenging course of action for the defender as it is often difficult to "fight through" the screen in order to stay on the same side of the offensive screener as the offensive screen target. However, going "above" the screen often allows the defender to maintain a good defensive position with respect to the offensive screen target by staying close to the offensive screen target through the screen. In contrast going "below" the screen generally refers to when the defender passes the offensive screener on the opposite side of the offensive screener as the offensive screen target. This is often simpler for the defender to achieve, relative to going "above" the screen, but it results in separation between the defender and the offensive screen target, which is undesirable as it often gives the offensive screen target an opportunity to make a play such as taking an undefended shot on the goal or driving toward the goal.

The measurement logic 1597 can determine if the defensive player goes above or below the screen by determining the position of the defensive player relative to the offensive screener and the offensive screen target. For example, based on the images captured by the cameras or otherwise, the measurement logic 1597 may determine whether the defender and the offensive screen target pass on the same side of the offensive screener. If so, the measurement logic 1597 determines that the defender has gone "above" the screen. If the measurement logic 1597 determines that the defender and the offensive screen target pass on opposite sides of the offensive screener, then the measurement logic 1597 determines that the defender has gone "below" the screen.

The measurement logic 1597 can track how the defender responds to being screened over time and can also track how the defensive player responds to screens from individual offensive players. As an example, the measurement logic 1597 may track the number of times that the defender goes "above" screens during a given time period and provide a parameter indicative of such number (e.g., a percentage of screens that the defender goes "above" the screen). The measurement logic 1597 may similarly track other outcomes, such as the number of times that the defender goes "below" the screen or otherwise defends against the screen. The measurement logic 1597 can also determine various parameters indicative of the effectiveness of the defender's responses to screens. As an example, for each screen, the measurement logic 1597 may determine whether the defender was able to maintain a defensive position with respect to the offensive screen target (e.g., stayed within a certain distance of the offensive screen target and/or stayed between the offensive screen target and the goal) or whether the offensive screen target was able to perform a certain action coming off of the screen (e.g., within a predefined time period after passing the offensive screener), such as taking an open shot at the goal or driving toward the goal unguarded by the defender. The measurement logic 1597 may track the number of times that one or more outcomes occur over a given time period and provide a parameter indicative of such number (e.g., a percentage of screens that a certain outcome occurs). The parameters tracked by the measurement logic 1597 may be correlated with the offensive players so that the defender's play against the offensive players can be ascertained and assessed. As an example, the data provided by the measurement logic 1597 may be used to determine how many times the defender went "over" a screen (or performed some other action) set by a particular screener relative to the number of times that he went "under" such a screen. Thus, the performance of the defender against screens set by the particular screener can be assessed.

The measurement logic 1597 can similarly track the motions and actions of the offensive players involved with the screen. In this regard, the same or similar actions and events tracked by the measurement logic 1597 for assessing the defender's play can be used to assess the play of the offensive players. As an example, the measurement logic 1597 may track the number of times that the offensive screen target caused his defender to go "below" the screen or perform some other action during the screen. The measurement logic 1597 can also track the number of times that the offensive screen target is able to take a shot at the basket, dribble towards the basket, make a pass to another offensive player, possibly resulting in an assist, or perform some other action coming off of the screen.

The measurement logic 1597 can similarly evaluate the performance of the offensive screener. As an example, the measurement logic 1597 can determine the proximity of the offensive screener to the defender of the offensive screen target. The measurement logic 1597 can determine the speed with which the offensive screener is able to set the screen, i.e., how fast does the screener obtains a stationary position, and the timing with which the screener sets the screen, i.e., the time between when the screener establishes the screen and the time when the defender arrives at the screener or contacts the screener. The measurement logic 1597 can evaluate the general effectiveness of the offensive screener by tracking one or both of the responses of the offensive screen target and the defender and can also evaluate the effectiveness of the screener with respect to individual teammates and/or individual defenders. In particular, similar to the tracking of the defender described above, the measurement logic 1597 can correlate the parameters tracked for a given offensive player to the screen defenders in order to track the offensive player's performance against certain defenders. As an example, the data provided by the measurement logic 1597 may be used to determine how many times a particular offensive screener, offensive screen target, or a pair of offensive screener and offensive screen target caused a particular defender to go "under" a screen (or perform some other action).

In one embodiment, the measurement logic 1597 can evaluate the effectiveness of the offensive screener by determining when the screener performed illegal screens. The measurement logic 1597 can determine an illegal screen, sometimes referred to as a "moving" screen, based on whether the person was called for a foul. The measurement logic 1597 can also determine illegal screens by evaluating the movements of the offensive screener regardless of whether a foul is called. The measurement logic 1597 can determine an illegal screen by determining an extent to which the screener's hips or torso moves during the screen. The measurement logic 1597 can also detect an illegal screen if the screener moves (e.g., "sticks out") a hip, knee, leg, elbow, etc., while in the stationary position to impede the progress of the defender in an impermissible way.

In one embodiment, the measurement logic 1597 can use entropy modeling to determine when dribbling, transition and/or passing unpredictability, screening unpredictability and/or defender unpredictability is beneficial or detrimental to the player and/or team. For example, the measurement logic 1597 may determine that dribbling, transition and/or passing unpredictability in a player is beneficial because the unpredictability of the player can make it more difficult for a defensive player to "scout" the movements of the player. However, the measurement logic 1597 may determine that the dribbling, transition and/or passing unpredictability of a player is detrimental if the player does not have good control of the ball and generates a high number of turnovers or low number of scores or assists.

The improvement logic 1594 can be used to analyze data about the person shooting, dribbling and/or passing the ball and the defender of the person shooting, dribbling and/or passing the ball and recommend methods to improve either shooting, dribbling and/or passing capability or defensive capability and to predict the amount of improvement in shooting, dribbling and/or passing capability or defensive capability. The improvement logic 1594 can use information from identification logic 1592, ball path logic 1591, defender motion logic 1593, balance logic 1599, measurement logic 1597, historical data 1596, body motion data 1598 and/or evaluation data 1582 to identify opportunities to improve the performance and capabilities of the person shooting, dribbling and/or passing the ball and the defender(s) of the person shooting, dribbling and/or passing the ball.

The improvement logic 1594 can recommend particular practice routines, game drills and technique modifications depending on the specific performance area of requiring improvement. For example, if the measurement logic 1597 indicates that a person is dribbling or passing the ball too high such that the ball is being stolen frequently by the defender, the improvement logic 1594 can recommend one or more training or practice routines that require the person to dribble with a lower dribbling height or pass with a lower passing height. In another example, if the measurement logic 1597 indicates that a defender often allows a dribbler to easily move past them on the way to the basket, the improvement logic 1594 can recommend one or more training or practice routines that function to improve lateral defensive speed.

The improvement logic 1594 can map specific training or practice routines to performance areas. The improvement logic 1594 can also map skill level designations (e.g., needs significant improvement) to the training or practice routines. Then, when the improvement logic 1594 identifies a performance area that requires improvement, the improvement logic 1594 can select a training or practice routine that has been mapped to the performance area requiring improvement. The improvement logic 1594 can also narrow the selection of the training or practice routine from the mapping based on the assessment of the performance area by measurement logic 1597 such that the selected training or practice routine better matches the actual skill level of the person.

In another embodiment, the improvement logic 1594 may not be able to recommend a specific practice routine, game drill and technique modification because there may be multiple areas requiring improved performance and/or there may be multiple practice routines, game drills and technique modifications that can be used to address a specific area requiring improvement. For example, if a dribbler often has their shot blocked or tipped when taking a jump shot off the dribble, the problem might be an inability to get sufficient separation from the defender prior to picking up the dribble, or the problem might be a slow transition from dribble to shooting position, or the problem might be a slow shot release, or the problem might be a low shot release (as determined by measurement logic 1597 based on the trajectory of the ball for the shot and the location of the shooter's body parts such as his/her hand and/or elbow), or the problem might be a combination of the above challenges. In another example, if a defender is often unable to disrupt a jump shot off the dribble (e.g., block or tip the jump shot) the problem might be an inability to limit the separation by the person dribbling the ball prior to the jump shot, or the problem might be a slow transition from dribbling defensive position to shooting defensive position, or the problem might be a off-center hand placement, or the problem might be a combination of the above challenges.

In situations where there is not a readily identifiable improvement regimen or multiple possible improvement regimens, the improvement logic 1594 can select other players (e.g., other dribblers or defenders) who have previously shown similar dribbling or defensive performance with a subsequent improvement in performance (e.g., an improvement above a threshold amount) based on the shooting, dribbling and/or passing or defensive characteristics determined by the measurement logic 1597. The improvement logic 1594 can store information on the training or practice routines completed by each person in historical data 1596. The improvement logic 1594 can also store information of the person's performance level after completion of a training or practice routine and correlate the change in the player's performance level to the training or practice routine. The improvement logic 1594 can review the selected players' practice techniques and improvement pace from historical data 1596 to determine an optimal set of practice techniques for the person shooting, dribbling and/or passing the ball or the defender being analyzed by the improvement logic 1594.

In another embodiment, the improvement logic 1594 can use information from scoring logic 1595 to determine the performance areas requiring the most improvement. The improvement logic 1594 can review the historical data 1596 for other players (e.g., other dribblers, passers or defenders) who have a similar performance area requiring improvement and their corresponding practice techniques to determine an optimal set of practice techniques and predicted improvement for the area requiring improvement.

In one embodiment, the historical data 1596 can include a large database of many players with many parameter types undergoing many practice and game dribbling regimens that can all be quantitatively measured. The improvement logic 1594 can implement a methodology to maximize the improvement process in the most efficient way. For example, the improvement logic 1594 may identify patterns across multiple quantitative dimensions in order to describe the specific problem and then prescribe the best approach for improvement.

Balance logic 1599 can be used to measure and/or categorize the effectiveness of the player's balance on the performance of the player. For example, if the person dribbling the ball has good balance, the person can more effectively move left, right, back, forward, up, down, and with different dribbling techniques at different speeds, accelerations, heights, and angles. In one embodiment, balance logic 1599 can use machine learning and/or artificial intelligence to measure and/or categorize a player's balance directly or indirectly.

In one embodiment, the balance logic 1599 may directly assess the balance of player by determining and analyzing the center of mass of the player relative to the player's body. The balance logic 1599 can determine a player has good balance if the player's center of mass does not rapidly change position in response to movements of the player. The balance logic 1599 may also make indirect determinations regarding balance based on factors such as fluidity, rapid acceleration, foot placement and/or sluggishness. For example, if the balance logic 1599 determines that a player has motions that are fluid, the balance logic 1599 can determine that the player has better balance than a player whose motions are less fluid. Similarly, if the balance logic 1599 determines that the player has rapid acceleration in one or more movements, the balance logic 1599 can determine that the player has better balance. The balance logic 1599 may also make a determination of balance regarding a player based on the foot placement of the player in response to a variety of different situations.

In addition, the balance logic 1599 can also be used to determine the defender's ability to respond to particular situations. The defender's ability to respond to a situation is dependent on the actions of the person dribbling the ball. For example, if the person dribbling ball is attempting a shot with the ball (as determined by ball path logic 1591), the balance logic 1599 can determine if a defender is in a low position or an extended position and thus determine the defender's ability to respond. For example, if the defender is already in an extended position as determined by balance logic 1599, the balance logic 1599 may determine that defender does not have the desired muscle contraction available to respond appropriately to an up movement by the person dribbling the ball. Further, the balance logic 1599 can also determine whether the defender's ability to respond is limited by the physical positions of other defenders or the physical position of the person shooting, dribbling and/or passing the ball.

In one embodiment, historical data 1596 can include data obtained during a training sequence in a confined training space (e.g., a bounded dribbling area 1516). An example of a confined training space is described by: U.S. Pat. No. 9,734,405, entitled "Systems and Methods for Monitoring Objects in Athletic Playing Spaces" and issued on Aug. 15, 2017, which is incorporated herein by reference. When historical data 1596 is obtained during a training sequence, information pertaining to the movement of the ball in relation to the movement of the person can be more easily obtained since the camera(s) 1502 and the sensors 1514 can be placed at appropriate locations to reduce and possibly eliminate any occlusion of the ball or the person. The complete tracking of the ball and the person in the historical data 1596 can permit the ball path logic 1591 to more accurately determine probabilities of movement when the ball or person becomes occluded. The ball path logic 1591 can determine the expected movement of the ball based on information in historical data 1596 that is similar to the location and position of the dribbler or passer when the ball becomes occluded.

The performance evaluation logic 1603 can be used to evaluate player performance and determine if the player's performance level is below an expected performance level for the player. Some reasons a player may perform at a lower than expected performance level may include the player having an unreported injury, the player being under the influence of a substance, or the player is intentionally trying to alter the natural outcome of the sporting event or a particular portion of the sporting event (e.g., the player is intentionally trying to lose the sporting event, miss a shot during the sporting event, or perform another type of action for intentionally altering the outcome of a bet associated with the sporting event, such as whether a point spread is covered). The performance evaluation logic 1603 can use information and/or data from measurement logic 1597, historical data 1596, fatigue data 1601, body motion data 1598, balance logic 1599, scoring logic 1595 and/or identification logic 1592 to determine whether the player's performance is below the level of performance that is expected from the player.

The performance evaluation logic 1603 can categorize an action (e.g., shooting, passing or dribbling) taken by the player based on information from measurement logic 1597 and obtain the performance characteristics (which can be represented by performance parameters) associated with the action. In one embodiment, the action can be categorized based on the identity of the player performing the action and the type of action that has been performed. In other embodiments, the action may be further categorized based on other factors such as the sporting event situation (e.g., a particular time and/or score of the sporting event), the fatigue level of the player, the defender guarding the player, the level of defense applied to the player, the hand(s) of the player used to perform the action, etc. In addition, the performance characteristics of the action can include characteristics associated with the ball flight or ball movement during the action and characteristics associated with the body positioning of the player performing the action (e.g., balance, head position, hand position, leg position, body position, etc.).

Once the action has been categorized, the performance evaluation logic 1603 can then evaluate the performance parameters associated with the characteristics for the action with respect to historical performance parameters stored in historical data 1596 for the same categorized action (i.e., an action having the same factors). As a player engages in training sequences and/or participates in sporting events, information and/or data regarding the player's actions (e.g., passing, shooting and/or dribbling) is acquired, categorized and stored in historical data 1596 to build up a profile of the player's performance. The profile of the player's performance can include, for each categorized action, an expectation for the performance characteristics for that action. The expectation for a particular performance parameter can include an expected value, a range of expected values, or other suitable parameter. The expectation for a performance parameter can be based on the prior actions (and corresponding performance parameters) of the player. The previously recorded performance parameters for an action can be numerically and/or statistically processed to generate the expectation. In addition, in one embodiment, each performance parameter of an action may have a corresponding expectation and each performance parameter can be evaluated with respect to the expectation. In other embodiments, all of the performance parameters (or a portion thereof) can be evaluated as a group with respect to an expectation associated with the group. For example, if the action is a jump shot, some of the performance parameters that may be evaluated with respect to expectations can include parameters associated with the entry angle, release height of the shot, the shot placement and any other suitable performance characteristic for a jump shot.

The performance evaluation logic 1603 can determine the probability that the player's action was an atypical (i.e., not expected) action for the player based on the evaluation of the performance parameters for the action with respect to the expected performance parameters for the action. Alternatively, the performance evaluation logic 1603 can determine the probability that the player's action was typical (i.e., expected) for the player. The determined probability can then be compared to a threshold to determine the likelihood that the player's action was atypical for the player based on the player's prior performance. If the determined probability is within the threshold, the performance evaluation logic 1603 can conclude that the player's action is typical for the player. However, if the determined probability is outside of the threshold, the performance evaluation logic 1603 can determine that the player's action was atypical for the player and take additional steps to determine if the player's reduced performance is intentional (or resulting from an injury).

In one embodiment, the performance evaluation logic 1603 can take the additional step of notifying a user that the player's performance is atypical (i.e., below the expected performance level for the player) so the user can perform an evaluation of the player's performance. In another embodiment, the performance evaluation logic 1603 can store the information about the player's atypical action and use the stored information about a player's atypical actions to determine a probability that the player is not performing to the player's full capabilities. The performance evaluation logic 1603 can generate a lower probability that the player is performing at a reduced level if the player only has a small number atypical actions (e.g., 1 or 2) during a sporting event (or a portion thereof). The performance evaluation logic 1603 can generate a higher probability that the player is performing at a reduced level if the player has an increased number of atypical actions (e.g., 4 or 5) during a sporting event (or a portion thereof) or has a predetermined number of consecutive atypical actions (e.g., 3-4).

Figure 8:
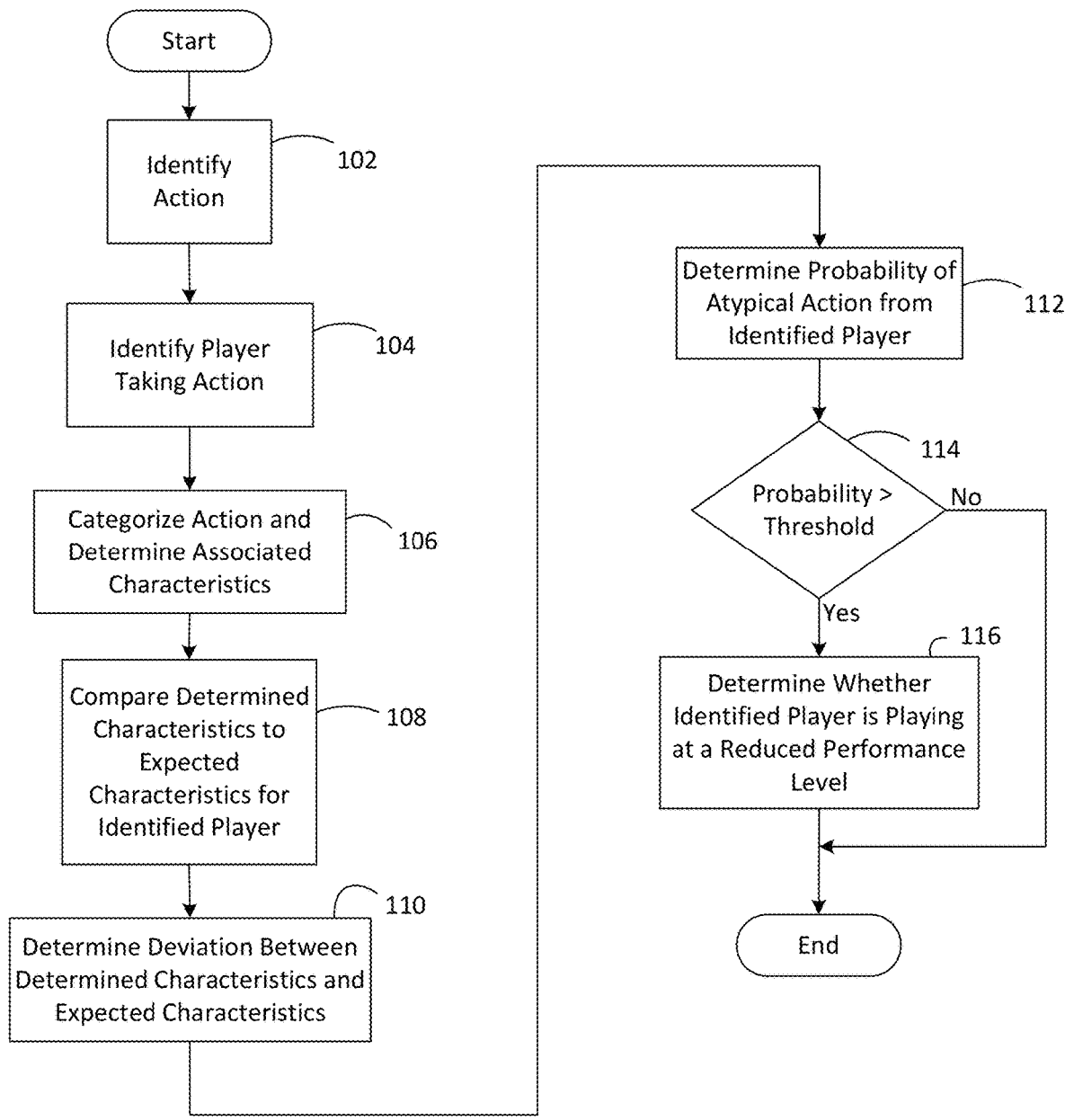
FIG. 8 is an information flow diagram of an embodiment of evaluating whether a player is playing at a reduced performance level during a sporting event.

FIG. 8 shows an embodiment of a process for evaluating whether a player is playing at a reduced performance level during a sporting event (or game sequence). The process begins with the computing device 1504 identifying an action (e.g., shooting, dribbling or passing) taken during the sporting event (step 102). The computing device 1504 can then identify the individual player taking the action (step 104) using any suitable techniques (e.g., facial recognition). The action can be categorized and the associated parameters associated with characteristics for the action can be determined or obtained (step 106). In one embodiment, the action can be categorized based on the identity of the person performing the action and the type of action being performed. However, in other embodiments, other factors (e.g., the sporting event situation, the fatigue level of the player, the defender guarding the player, the level of defense applied to the player, the hand(s) of the player used to perform the action, etc.) in addition to the identity of the person and the type of action can be used to categorize the action. For example, the identified action may be a shooting action categorized as a jump shot having measured parameters associated with characteristics such as entry angle, release height of the shot, and shot placement associated with the shooting action.

Once the associated parameters of the identified action are determined, the determined parameters can be compared to expected parameters for the identified player for the same categorized action (step 108). The expected parameters for each categorized action for the identified player can be stored in historical data 1596 and be based on the previous actions of the identified player. The comparison of the determined parameters to the expected characteristics can be used to determine if there is a deviation between the determined parameters and the expected parameters (step 110). In one embodiment, the parameters may be individual compared, but the parameters may be collectively compared in other embodiments. In addition, the comparison may involve the comparison of the determined parameter to an expected value or range of values to determine the deviation from the expected parameter.

The deviation (if any) between the determined parameter and the expected parameter can be used to determine the probability that the identified action of the player was an atypical action for the player (step 112). An atypical action for a player can be an action that has parameters that do not correspond to the parameters for similar actions previously taken by the player. Once the probability of an atypical action is determined, the determined probability can be compared to a threshold probability (step 114). If the determined probability is less than threshold probability, then the identified action for the player, while being atypical for the player, is concluded to be not indicative of the player performing at a reduced performance level and the process ends. However, if the determined probability is greater than the threshold probability, the additional steps are taken to determine whether the identified player is performing at a reduced performance level (step 116) and the process ends. In one embodiment, the additional steps can include providing a notification to a user via the output device 1508 to have the user review the actions of the player to determine if the player is intentionally performing at a reduced level. In another embodiment, the determination that the player is performing at a reduced level can be based on the number and/or frequency of atypical actions for the player during the sporting event. For example, 3 atypical actions occurring within 10 minutes of game play or 3 consecutive atypical actions may be indicative of an intent by the player to perform at a reduced performance level. If the determination is made that the player is performing at a reduced level, a notification can be provided to a user via output device 1508 that the player is believed to performing at a reduced performance level.

In one embodiment, the process of FIG. 8 can be performed dynamically while the sporting event is occurring in real time. A user (e.g., a coach) can use the dynamically generated information about a player's performance to make decisions regarding team strategy and player substitutions. In another embodiment, the process of FIG. 8 can be performed on a recording of a sporting event to accumulate data on performance characteristics for the players and/or to verify the integrity of the outcome of the sporting event (i.e., confirm that the outcome of the sporting event was not influenced by one or more players intentionally performing below their expected performance level).

In one embodiment, the performance evaluation logic 1603 may use machine learning to determine whether the player is performing at a reduced performance level. As known in the art, machine learning generally involves training a computer through the use of artificial intelligence by analyzing sample data sets to recognize data patterns that likely result in certain outputs or outcomes. Such machine learning methods may be used by the computing device 1504 to identify certain characteristics associated with an action taken by a player during a sporting event. The characteristics may include characteristics associated with either the action itself or the player performing the action.

In an embodiment, the machine learning system may be trained to learn that parameters associated with a set of characteristics corresponds to how a player usually performs a specific action during a sporting event. Then, when the player takes an action during the sporting event, the parameters associated with the action can be compared to the set of parameters associated with how the player usually performs that action. If there are significant differences between the parameters, the machine learning system can identify that the action was an atypical action for the person and that the player may be performing at a reduced performance level.

To further illustrate, assume that the historical data 1596 includes data indicative of shooting characteristics of a player for various categories of shots, such as a jump shot. Such data may have been defined by tracking a large number (e.g., thousands, such as over 10,000, 100,000 or 1,000,000) of jump shots by the player or in some embodiments other players previously. Such data many include measurements of the shot type, such as entry angle into a hoop, shot placement relative to the hoop, release height, shot height, or any other measurable attributes affecting shot performance, including any shot attributes described above. The data may also include information indicative of movements of the player's body parts, such as an elbow, a foot, a hand, head, torso, etc. of the player while attempting jump shots. Such data may have been analyzed to determine, for each measured attribute, an expected range for that measurement (i.e., a range indicating that the player is likely attempting a normal shot (relative to the player's past performance) when the measurement is within the range). These predefined ranges may be included in the historical data 1596 stored in memory 1562.

During a basketball game, the player may be tracked by the system 1500, and when the player attempts a basketball shot, the object tracker 1562 may track and analyze the shot to categorize it. As an example, the posture of the player's body, jump height, hand or arm movement may indicate the type of shot that the player is attempting. For illustrative purposes, assume that the object tracker 1562 determines that the player is attempting a jump shot. In such case, the object tracker 1562 determines various shooting characteristics of the jump shot and compares it to the shooting characteristics for the same type of shot (i.e., jump shot in this example) for the same player stored in the historical data 1596. As an example, the object tracker 1562 may determine the entry angle for the shot and compare such entry angle to the entry-angle range indicated by the historical data 1596 to determine whether the entry angle is in the player's normal range based on the player's past performance over a large number of jump shots in the past. Such comparison may indicate a normal shot when the entry angle is within the predefined range or may indicate an atypical shot when the entry angle is outside of the predefined range. Similar comparisons may be performed for other attribute measurements to provide an overall score indicative of whether the shot is deemed to be normal or atypical. For example, the score may be defined such that it is higher (or alternatively lower in another embodiment) when more parameters indicate a normal shot. In such an example, the object tracker 1562 may deem the shot to be normal when the score is above a predefined threshold and may deem the shot to be atypical when the score is below the predefined threshold. In some embodiments, the score may be determined by a machine learning system that provides a higher (or alternatively a lower in another embodiment) score when the parameters associated with the attribute indicate that a normal shot is more likely.

Note that some characteristics may be weighted more in the shot assessment relative to other characteristics. As an example, it may be determined that the value of the entry angle may be a particularly important characteristic for indicating shot quality or player intent in whether the player is attempting to make the shot, and this characteristics may be weighted greater relative to one or more other characteristics that may be determined to be less important in indicating shot quality or player intent.

Over the course of all or part of a basketball game, the object tracker 1562 may track the shot assessments described above to determine a score indicative of the player's overall performance for the time period. In some embodiments, such score may indicate the extent to which the player's performance is consistent with his/her past performance indicated by the historical data 1596 (e.g., whether the player's overall performance for the time period is normal or atypical). As an example, the score may be indicative of a ratio of shots determined to be normal to shots determined to be atypical. In some embodiments, such score may be algorithmically determined to indicate a probability that the player intentionally played with reduced performance, played with reduced performance for one or more reasons of interest, such as injury or intent to affect an outcome of a wager associated with the game, or intentionally missed at least some shots.

Note that in determining a score indicative of whether a particular shot or overall performance is atypical, the object tracker 1562 may take into account various factors. As an example, when a player is determined to have a high level of fatigue, the scores may be adjusted or otherwise controlled such that a poor shot has less effect on the score. That is, it is reasonable to expect a player's shot characteristics to change as he or she fatigues. When a player is deemed to be highly fatigued, the player's score may be adjusted so that it is less impacted by a particular parameter being slightly outside of an expected range. Alternatively, the ranges compared to the shot parameters may be adjusted based on the player's fatigue level so that it takes a greater deviation from normal to trigger an atypical assessment when he or she is highly fatigued. Note that the changes to the ranges may be based on past performance by the player, as indicated by the historical data 1596, when the player was deemed to be similarly fatigued.

The object tracker 1562 may similarly take into account other factors that likely affect shot performance. As an example, as described above, the object tracker 1562 may be configured to determine a value indicative of how well or closely a defender is guarding a player as the player is performing an action, such as a dribble or a shot. If the value indicates that the player is closely guarded while taking a shot, then the player's performance score for the shot may be adjusted or otherwise controlled to account for the defensive guarding such that a poor shot has less effect on the score. That is, it is reasonable to expect a player's shot characteristics to change depending on how well or closely he is guarded. When a player is deemed to be closely guarded, the player's score may be adjusted so that it is less impacted by a particular parameter being slightly outside of an expected range. Alternatively, the ranges compared to the shot parameters may be adjusted based on the defensive guarding determined for the shot so that it takes a greater deviation from normal to trigger an atypical assessment when he or she is closely guarded. Note that the changes to the ranges may be based on past performance by the player, as indicated by the historical data 1596, when the player was deemed to be similarly guarded.

In assessing the overall score of the player's performance, it is possible for some shots to be weighted more than others. As an example, based on some game situations, it is possible for the object tracker to identify one or more shots to be more important or otherwise weighted to a greater extent than others, such as a shot near the end of the game or based on the score of the game. It is possible for the object tracker 1562 to receive user input indicating when a situation in a game is deemed to be crucial or more important than others, but it also possible for the object tracker 1562 to automatically identify such situations. As an example, the object tracker 1562 may compare the game score of one team to the game score of the other team and determine that shots taken when the difference of the two scores is in a certain range are to be weighted more. As an example, shots when the difference in team scores is less than 5 points (or some other threshold) may be weighted more than when the difference is greater than 5 points. In other embodiments, the difference of the team scores may be compared to a threshold, such as a point spread for a wager associated with the game. As an example, if a player is attempting to manipulate the outcome of a wager by intentionally missing shots or otherwise underperforming when the difference of the game score is close to the point spread (or at some other game situation), the object tracker 1562 is more likely to identify his or her performance as atypical since shots taken in such situation are weighed more than shots in other situations.

In at least some embodiments described above, information about a player's current shot or other action is described as being compared or otherwise evaluated relative to historical data about previous shots performed by the same player. However, it should be emphasized that it is unnecessary for the historical data to be derived from the same player. For example, it is possible for a player's current shot or other action to be compared or otherwise evaluated in the same or similar manner relative to historical data derived from actions of one or more other players. Regardless of the source of the historical data, the use of such historical data, which may include a large number of samples for the type of action being analyzed to provide statistical accuracy and meaning, allows the system to discern intent based on even small deviations from typical behavior.

In another embodiment, the object tracker 1562 may implement machine learning system to evaluate whether negative actions (i.e., actions having negative results) from the player (e.g., missing shots, throwing bad passes, dribbling the ball carelessly, etc.) or reduced performances are intentional. The machine learning system can receive as inputs the camera data 1578, sensor data 1580 and/or parameters generated by the object tracker 1562 and generate an output that is indicative of whether the system deems it likely that the player intentionally took negative actions, such as intentionally playing with reduced performance for one or more actions (e.g., shots). The output of the machine learning system can then be used to make a determination regarding the player intentionally taking negative actions for illegitimate reasons (e.g., to control the outcome of specific gambling wagers). In one embodiment, the output of the machine learning system can be a probability value such that the higher (or lower) the value from the machine learning system, the greater the probability that the player is intentionally taking negative actions (e.g., missing shots) or otherwise intentionally underperforming.

The machine learning system can evaluate a plurality of parameters associated with an action by the player to generate the output. The plurality of parameters evaluated by the machine learning system may correspond to parameters provided by the object tracker 1562 (e.g., parameters indicative of a trajectory of a shot), but the plurality of parameters may also include "self-generated" parameters from the machine learning system. The self-generated parameters can be determined by nodes of a neural network implementing a deep learning process to improve output. The self-generated parameters can be based on information or data from one or more of the camera data 1578, the sensor data 1580 or input parameters from the object tracker 1562.

Prior to using the machine learning to evaluate the actions of a player, the machine learning system can be trained. The training of the machine learning system can involve the providing of numerous inputs (e.g., thousands of input or more) to the machine learning system to train it to learn parameters that are indicative of player intent. As an example, any of the types of sensors described herein (e.g., cameras) may be used to capture the historical data associated with the player (and/or other players) taking a large number of shots, and this data may include the raw sensor data and/or processed sensor data, such as parameters (e.g., trajectory parameters or body motion parameters) measured from the sensor data. The object tracker 1562 implementing a machine learning system may analyze such data to learn parameters indicative of intent. In the context of a neural network, the learned parameters may be defined by values stored in the nodes of neural network for transforming input to the desired output. In this way, the machine learning system may learn which performance characteristics are likely indicative of an intentional negative action, such as a missed shot, and evaluate parameters indicative of such characteristics to make an assessment about when a player intentionally performs a negative action such as a missed shot.

Such machine learning may be used to implement the concepts described above or similar to the concepts described above for non-machine learning embodiments. As an example, as described above, it is possible for certain trajectory parameters, when in certain ranges, to be indicative of an intent to miss a shot. When the object tracker 1562 implements a machine learning system, it may learn the necessary parameters so that when the trajectory parameters are in the ranges indicative of an intent to miss a shot, the output of the machine learning system indicates the missed shot was likely intentional.

In some embodiments, the machine learning system implemented by the object tracker 1562 may be trained using shot data from a large number of shots (or other types of actions) taken by a plurality of users. During training, the machine learning system may be configured to learn parameters indicative of performance characteristics that likely show an intent for a missed shot (or other type of negative action). Such parameters may be based on the trajectory of the object being launched by the player or of body motions of the player in launching the object (or performing another type of action).

When the player performs an action, such as takes a basketball shot, to be assessed for whether his or her performance is atypical (e.g., whether the player intentionally misses the shot), the object tracker 1562 may provide sensor data from the shot, as determined by one or more sensors (e.g., cameras), as an input to the machine learning system. The object tracker 1562 may also calculate various parameters based on the sensor data indicative of player performance and provide such parameters as input to the machine learning system. As an example, the object tracker 1562 may identify in the sensor data an object launched by the player toward a goal and calculate one or more trajectory parameters indicative of the object's trajectory. Based on identification of the player performing the action, the object tracker 1562 may also provide as input historical data 1596 that is associated with the identified player and indicates historical performances of the player in performing a plurality of previous actions of the same type (e.g., same shot type). In some embodiments, the object tracker 1562 may algorithmically determine the shot type for the current shot and, based on such determination, search for and provide to the machine learning system historical data 1596 indicative of such shot type, or alternatively, the object tracker 1562 may provide historical data 1596 associated with a plurality of shot types for use by the machine learning system in evaluating the player's current shot.

In any event, if the current shot is determined to be missed (i.e., not pass through the goal), the machine learning system of the object tracker 1562 may evaluate the inputs for the current shot relative to the learned parameters to determine a value indicative of whether the shot is intentionally missed. In making such assessment, the machine learning system may determine at least one parameter characterizing a performance of the player in performing the current action (e.g., shot) relative to the player or other players performing the same type of action during previous sporting events, as indicated by the historical data 1596. That is, if the learned parameters, when applied to the inputs (which may include inputs for the current shot and inputs based on historical data for previous shots taken by the player or other players) by the machine learning system indicate that the performance of the player in the current action is atypical relative to the performance of the player indicated by the historical data 1596 for past actions, then the machine learning system may provide an output indicating that the missed shot was likely intentional. In some embodiments, the output may include a value indicating a probability that the missed shot was intentional. Note that any of the factors described above may be used by the machine learning system in assessing the performance and intent of the player.

Figure 6:
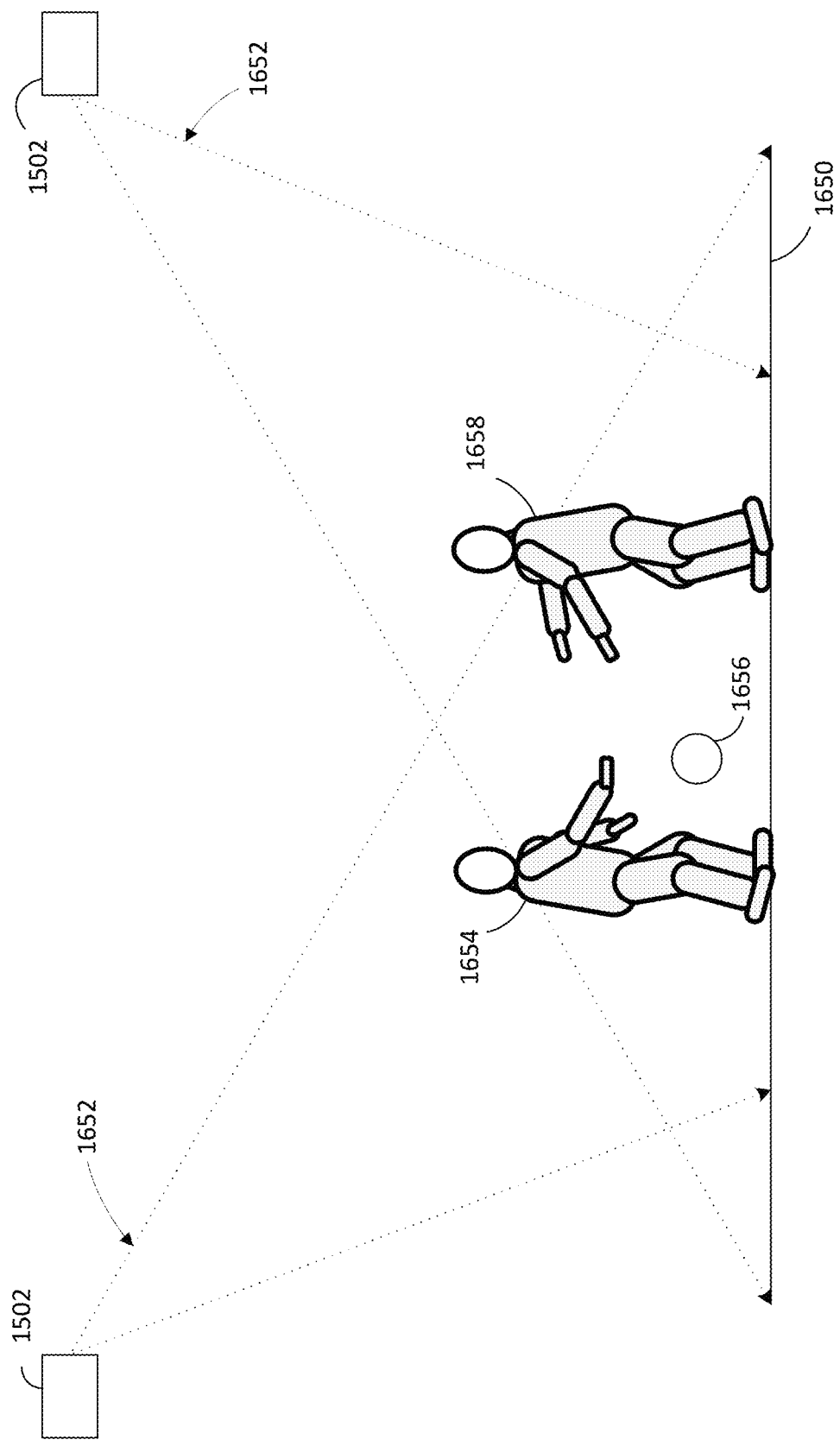
FIG. 6 is an illustration of an offensive and defensive basketball player on an athletic playing surface.

FIG. 6 shows an offensive and defensive basketball player on an athletic playing surface. As can be seen in the embodiment of FIG. 6, cameras 1502 can be located at each end of an athletic playing surface 1650 and can capture the entire athletic playing surface 1650 within the fields of view 1652 of the cameras 1502. The cameras 1502 can also capture an offensive player 1654, the ball 1656 and a defensive player 1658. The cameras 1502 may be able to capture a lot of information or very little information on the offensive player 1654, the ball 1656 and the defensive player 1658 depending on their locations on the athletic playing surface 1650 and their positions with respect to the cameras 1502. As discussed above, the ball 1656 may be occluded from the fields of view 1652 of the cameras, as shown in FIG. 6, based on the positions of the offensive player 1654 and the defensive player 1658. The cameras 1502 can also capture information on other players (not shown) on the athletic playing surface 1650. The images of the offensive player 1654, the ball 1656 and the defensive player 1658 captured by the cameras 1502 can be processed by the object tracker 1562 as discussed above.

Figure 7:
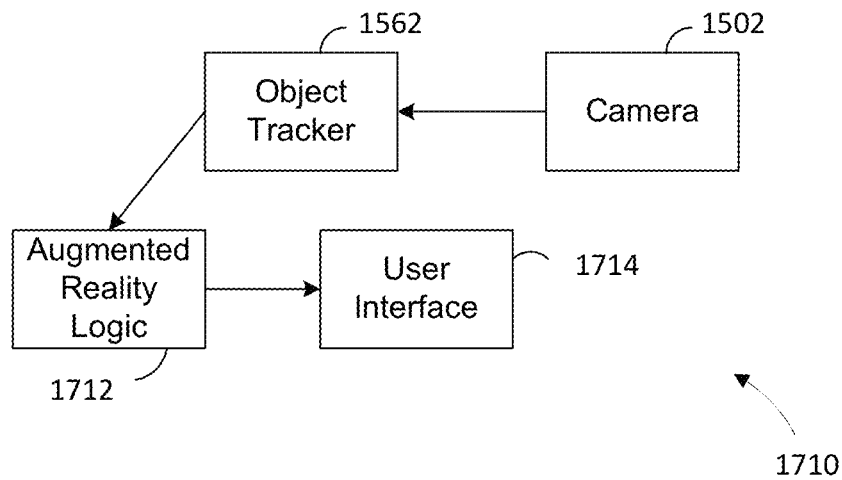
FIG. 7 is a block diagram of an embodiment of augmented reality system for the tracking system.

In one embodiment, the computing device 1504 can use an augmented reality system to provide a training sequence that simulates a game situation for a person shooting, dribbling and/or passing the ball or a defender. As shown in FIG. 7, an augmented reality system 1710 can include augmented reality logic 1712. The augmented reality logic 1712 can be implemented in software, hardware, firmware or any combination thereof. The augmented reality logic 1712 can be part of the object tracker 1562 or be a standalone system in memory 1566. The augmented reality logic 1712 can transmit, using communication interface 1576, images associated with a simulated game situation to a user interface 1714 (e.g., a headset) used by the user. In one embodiment, the user interface 1714 can have a closed configuration (e.g., a full-sized helmet) that prevents the user from seeing any of the surrounding physical environment, or, in another embodiment, the user interface 1714 can have an open configuration (e.g., a pair of glasses) that permits the user to see the surrounding environment while a projection of the game is occurring. In one embodiment, the user interface 1714 can be an output device 1508. The system 1500 can capture the user's responses to the simulated game situation with cameras 1502 and/or sensors 1514 and process the captured information with object tracker 1562 as described above. The object tracker 1562 can provide information on the user's responses to the augmented reality logic 1712, which can update the simulation provided to the user.

The augmented reality logic 1712 can match the skill of the simulated defender to the particular skills to be developed in the training sequence. For example, the skill level of the simulated defender may be set lower than the skill level of the person in the training sequence to permit the person shooting, dribbling and/or passing the ball to develop new moves that are effective against less proficient defenders. In contrast, the skill level of the simulated defender can be set greater than the person shooting, dribbling and/or passing the ball to permit the person to increase their skill or to learn ball protection sequences. The augmented reality logic 1712 can also be used to simulate multiple defenders during the training sequence. In one embodiment, the skill level of the simulated defender can be based on the skill of an actual defender as represented by the defender's defensive characteristics collected and stored in historical data 1596. In another embodiment, the skill level of the simulated defender can be based a combination of skills of several different defenders or can be generated by the augmented reality logic 1712 to provide the desired set of skills in the simulated defender.

The augmented reality logic 1712 can also match the skill of the simulated dribbler or passer to the particular skills to be developed by the defender in the training sequence. For example, the skill level of the simulated dribbler or passer may be set lower than the skill level of the defender in the training sequence to permit the defender to develop new moves that are effective against less proficient dribblers or passers. In contrast, the skill level of the simulated dribbler or passer can be set greater than the defender to permit the defender to increase their skill or to learn defensive sequences. The augmented reality logic 1712 can also be used to simulate multiple offensive players during the training sequence. In one embodiment, the skill level of the simulated dribbler or passer can be based on the skill of an actual dribbler or passer as represented by the dribbler's dribbling characteristics or passer's passing characteristics that are collected and stored in historical data 1596. In another embodiment, the skill level of the simulated dribbler or passer can be based a combination of skills of several different dribblers or passers or can be generated by the augmented reality logic 1712 to provide the desired set of skills in the simulated dribbler or passer.

In a further embodiment, the augmented reality logic 1712 can also be used to add simulated court lines or a simulated basketball hoop to environments where no court is actually present during the training sequence. By providing simulated boundaries and/or the basketball hoop to the user interface 1714 of the user when such conditions are not physically present, the augmented reality logic 1712 can provide a more realistic training environment and increase the benefit of the training sequence for the user.

The augmented reality logic 1712 can develop the skill level of the simulated defender or person shooting, dribbling and/or passing the ball in the training sequence by using machine learning and/or artificial intelligence in conjunction with historical data 1596. For example, factors such as the balance, footwork, foot placement, and/or acceleration of the player can be used in addition to the player's movements (e.g., body part placement and/or orientation) and/or ball motion can be used in establishing the skill level of the simulated player(s).

In still another embodiment, the augmented reality system 1710 can be used to allow one or more players to operate in an environment which has the appearance of a 10 or more player practice. In a further embodiment, the augmented reality system 1710 can be used by two separate people in different locations to simulate a one-on-one contest between the people. One of the persons can be an offensive player and the other person can be a defensive player. The cameras 1502 can capture information on each of the players at their respective locations and provide the information to their corresponding object tracker 1562 which can process the information. The object tracker 1562 can then provide the information (e.g., location on the court, player stance, player movements, etc.) on the one player to the augmented reality logic 1712 used by the other player which can then use the information from the object tracker 1562 on the one player to simulate the location and movements of the one player in the simulation provided to the other player. For example, a defender can be located at the foul line and in a stationary position while the dribbler can be located at the "top of the key" and moving towards the defender. The object tracker 1562 in the system 1500 of the defender can capture the defender's location on the court and the defensive stance and position of the defender. The information on the defender can then be provided to the augmented reality system 1710 of the dribbler, which can then generate a simulation of the defender at the defender's location at the foul line and with the defender's stationary position for the dribbler. Similarly, the object tracker 1562 in the system 1500 of the dribbler can capture the dribbler's location on the court and the dribbling stance and movement of the dribbler. The information on the dribbler can then be provided to the augmented reality system 1710 of the defender, which can then generate a simulation of the dribbler at the dribbler's location at the top of the key and with the dribbler's movement toward the defender. Similar techniques may be used with other numbers of players in any number of locations. As an example, a five-on-five game may be simulated with each player at a different court or other physical location and viewing simulations of the other nine players.

In one embodiment, as the information capture rate from the cameras 1502 and/or sensors 1514 increases, fewer cameras 1502 and/or sensors 1514 are required to obtain the same amount of information and/or data for processing. For example, a camera 1502 that captures 1000 frames per second would provide more data to computing device 1504 than a camera 1502 that captures 30 frames per second.

In another embodiment, an audio sensor can be used to determine one or more dribbling characteristics. For example, an audio sensor can detect a change in the sound associated with the dribbling motion and the object tracker 1562 can use the detected change in sound to determine a corresponding change in a dribbling characteristic such as dribbling rate or speed. In addition, the audio sensor may also be used to assist with determining the ball trajectory when the ball is occluded from view. For example, the audio sensor can detect the sound the ball makes when striking the floor and provide that information to identification logic 1592 and ball path logic 1591 to assist in determining the trajectory of the ball. The sound of the ball striking the floor can be used with other detected information (such as the detection of the ball leaving a person's hands) to determine the speed of the ball based on the time difference between the detected information and when the sound of the ball striking the floor is detected. Further, the detection of the ball striking the floor in a repetitive pattern may indicate that the person is dribbling the ball, even if the ball is occluded from the view of the cameras 1502.

Information passed between the different components in the system may be transmitted using a number of different wired and wireless communication protocols. For instance, for wire communication, USB compatible, Firewire compatible and IEEE 1394 compatible hardware communication interfaces and communication protocols may be used. For wireless communication, hardware and software compatible with standards such as Bluetooth, IEEE 802.11a, IEEE 802.11b, IEEE 802.11x (e.g. other IEEE 802.11 standards such as IEEE 802.11c, IEEE 802.11d, IEEE 802.11e, etc.), IrDA, WiFi and HomeRF.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

Now, therefore, the following is claimed:

1. A system for evaluating player performance during a sporting event, comprising:
    at least one sensor configured to capture sensor data associated with a player launching an object toward a goal for a first plurality of shots at the goal during a time period at the sporting event;
    at least one processor configured to receive the sensor data and to analyze the sensor data to determine a score indicative of an overall performance of the player during the time period for at least the first plurality of shots relative to performances of one or more players performing a second plurality of shots of one or more objects toward one or more goals during previous sporting events, the at least one processor configured to determine, based on the score, a probability that the player underperformed intentionally during the time period, the at least one processor configured to determine at least one first parameter indicative of at least one trajectory of the object for the first plurality of shots, the at least one processor configured to compare the at least one first parameter to at least one second parameter determined from historical data associated with the one or more players performing the second plurality of shots, the at least one processor further configured to determine the score based on at least one comparison of the at least one first parameter to the at least one second parameter; and
    an output interface configured to provide an output, including a value indicative of the determined probability that the player underperformed intentionally during the time period.

2. The system of claim 1, wherein the at least one first parameter is indicative of an angle or a location of the at least one trajectory relative to the goal.

3. The system of claim 1, wherein the at least one processor is configured to determine, based on the at least one comparison, an extent to which the first plurality of shots deviates from the second plurality of shots, and wherein the score is based on the extent to which the first plurality of shots deviates from the second plurality of shots.

4. A system for evaluating player performance during sporting events, comprising:
    at least one sensor configured to capture sensor data associated with a player launching an object toward a goal for a first plurality of shots of the object at the sporting event during a time period, the first plurality of shots including at least a first shot and a second shot;
    at least one processor configured to receive the sensor data and to determine a score indicative of an overall performance of the player during the time period based on how the first plurality of shots compares to a second plurality of shots indicated by historical data associated with one or more players shooting the second plurality of shots, the at least one processor configured to determine, based on the score, a value indicative of a likelihood probability that the player underperformed intentionally during the time period, the at least one processor configured to identify the object within the sensor data for at least the first shot, the at least one processor configured to determine a trajectory of the object for the first shot based on the sensor data and to determine at least one first parameter based on an angle or a location of the trajectory for the first shot, the at least one processor further configured to compare the at least one first parameter to at least one second parameter determined from the historical data for determining whether the first shot is atypical relative to the second plurality of shots indicated by the historical data, wherein the score is based on whether the first shot is determined to be atypical relative to the second plurality of shots indicated by the historical data; and
    an output interface configured to provide an output, including the value indicative of the probability that the player underperformed intentionally during the time period.

5. The system of claim 4, wherein the object is a basketball, and wherein the goal is a basketball goal having a hoop.

6. The system of claim 5, wherein the at least one first parameter is based on an entry angle of the basketball into the hoop.

7. The system of claim 4, wherein the at least one first parameter is based on a direction of the object.

8. The system of claim 4, wherein the at least one first parameter is based on a speed of the object.

9. A method for evaluating player performance during sporting events, comprising:
- capturing, with at least one sensor, sensor data associated with a player shooting an object toward a goal during a time period at a sporting event for a first plurality of shots;
- receiving the sensor data with at least one processor;
- determining, with the at least one processor based on the sensor data, a score indicative of an overall performance of the player during the time period for at least the first plurality of shots relative to performances of one or more players shooting a second plurality of shots of one or more objects toward one or more goals during previous sporting events;
- determining, with the at least one processor based on the score, a probability that the player underperformed intentionally during the time period;
- determining, with the at least one processor, at least one first parameter indicative of at least one trajectory of the object for the first plurality of shots;
- comparing, with the at least one processor, the at least one first parameter to at least one second parameter determined from historical data associated with one or more players shooting the second plurality of shots, wherein the determining the score is based on the comparing; and
- providing an output with an output interface, the output including a value indicative of the determined probability that the player underperformed intentionally during the time period.

10. The method of claim 9, wherein the object is a basketball, and wherein the goal is a basketball goal having a hoop.

11. The method of claim 10, wherein the at least one first parameter includes an entry angle of the basketball into the hoop.

12. The method of claim 9, wherein the at least one first parameter indicates a direction of the object.

13. The method of claim 9, wherein the at least one first parameter indicates a speed of the object.

14. The method of claim 9, further comprising determining, with the at least one processor, whether each shot of the first plurality of shots is atypical relative to the historical data.

15. A method for evaluating player performance during a sporting event, comprising:
- capturing, with at least one sensor, sensor data associated with a player shooting an object toward a goal for a first plurality of shots at the sporting event, the first plurality of shots including at least a first shot and a second shot;
- receiving the sensor data with at least one processor;
- identifying, with the at least one processor, the object within the sensor data for at least the first shot;
- determining, with the at least one processor, a trajectory of the object for the first shot based on the sensor data;
- determining, with the at least one processor, at least one first parameter based on an angle or a location of the trajectory for the first shot;
- determining, with the at least one processor, a score indicative of an overall performance of the player during the time period based on how the first plurality of shots compares to a second plurality of shots indicated by historical data associated with one or more players shooting the second plurality of shots;
- comparing, with the at least one processor, the at least one first parameter to at least one second parameter determined from the historical data;
- determining, with the at least one processor based on the comparing, whether the first shot is atypical relative to the second plurality of shots indicated by the historical data, wherein the determining the score is based on whether the first shot is determined to be atypical relative to the second plurality of shots;
- determining, with the at least one processor based on the score, a value indicative of a probability that the player underperformed intentionally during the time period; and
- providing an output with an output interface, the output including the value indicative of the probability that the player underperformed intentionally during the time period.

16. The method of claim 15, further comprising assessing, with the at least one processor, whether each shot of the first plurality of shots is atypical relative to the second plurality of shots.

17. The method of claim 16, further comprising counting, with the at least one processor, a number of the first plurality of shots assessed by the at least one processor to be atypical, and wherein the determining the score is based on the counting.

18. The method of claim 15, wherein the object is a basketball, and wherein the goal is a basketball goal having a hoop.

* * * * *